(12) United States Patent
Kimura

(10) Patent No.: US 10,091,417 B2
(45) Date of Patent: Oct. 2, 2018

(54) IMAGE PROCESSING APPARATUS, IMAGE PROCESSING METHOD, AND PROGRAM

(71) Applicant: Sony Corporation, Tokyo (JP)

(72) Inventor: Atsushi Kimura, Tokyo (JP)

(73) Assignee: Sony Corporation (JP)

( * ) Notice: Subject to any disclaimer, the term of this patent is extended or adjusted under 35 U.S.C. 154(b) by 246 days.

(21) Appl. No.: 14/403,858

(22) PCT Filed: Apr. 3, 2013

(86) PCT No.: PCT/JP2013/060182
§ 371 (c)(1),
(2) Date: Nov. 25, 2014

(87) PCT Pub. No.: WO2013/183346
PCT Pub. Date: Dec. 12, 2013

(65) Prior Publication Data
US 2015/0124049 A1    May 7, 2015

(30) Foreign Application Priority Data
Jun. 6, 2012 (JP) ................................. 2012-129100

(51) Int. Cl.
H04N 5/232 (2006.01)
G02B 13/06 (2006.01)
G03B 37/00 (2006.01)
G06T 3/40 (2006.01)

(52) U.S. Cl.
CPC ......... *H04N 5/23238* (2013.01); *G03B 37/00* (2013.01); *G06T 3/4038* (2013.01); *G02B 13/06* (2013.01); *H04N 5/23293* (2013.01)

(58) Field of Classification Search
CPC ... G03B 37/00; H04N 5/23238; G06T 3/4038
See application file for complete search history.

(56) References Cited

U.S. PATENT DOCUMENTS

| | | | |
|---|---|---|---|
| 8,024,144 B2 | 9/2011 | Kludas et al. | |
| 8,723,917 B2 | 5/2014 | Ohki | |
| 9,398,216 B2 | 7/2016 | Kimura | |
| 9,762,796 B2 | 9/2017 | Kimura | |
| 2005/0104977 A1* | 5/2005 | Nozaki | H04N 1/2112 348/231.7 |

(Continued)

FOREIGN PATENT DOCUMENTS

| | | |
|---|---|---|
| CN | 1957349 A | 5/2007 |
| CN | 101709962 A | 5/2010 |

(Continued)

OTHER PUBLICATIONS

International Search Report corresponding to PCT/JP2013/060182, dated May 28, 2013, 2 pgs.

(Continued)

*Primary Examiner* — Neil Mikeska
(74) *Attorney, Agent, or Firm* — Lerner, David, Littenberg, Krumholz & Mentlik, LLP

(57) ABSTRACT

There is provided an image processing apparatus including an association section configured to, in a case where panorama image data generated by using a plurality of frame image data obtained by an imaging operation while displacing an imaging direction is determined to be a full circumference panorama image, associate the panorama image data with information showing that the panorama image data is the full circumference panorama image.

19 Claims, 28 Drawing Sheets

(56) References Cited

U.S. PATENT DOCUMENTS

| | | | |
|---|---|---|---|
| 2005/0265161 A1 | 12/2005 | Ahn et al. | |
| 2010/0085442 A1* | 4/2010 | Yamashita | H04N 5/232 348/222.1 |
| 2010/0119177 A1* | 5/2010 | Suzuki | G06K 9/00771 382/307 |
| 2010/0171810 A1 | 7/2010 | Ohki | |
| 2011/0001759 A1* | 1/2011 | Kim | H04N 7/0122 345/629 |
| 2011/0181687 A1* | 7/2011 | Yoshizumi | H04N 5/23238 348/36 |
| 2012/0059720 A1* | 3/2012 | Musabji | G01C 21/3638 705/14.58 |
| 2012/0062691 A1* | 3/2012 | Fowler | F16M 11/10 348/36 |
| 2012/0075411 A1 | 3/2012 | Matsumoto et al. | |
| 2012/0307001 A1* | 12/2012 | Osako | A63F 13/92 348/36 |

FOREIGN PATENT DOCUMENTS

| | | |
|---|---|---|
| JP | 2001-109881 A | 4/2001 |
| JP | 2003-224838 A | 8/2003 |
| JP | 2005-223416 A | 8/2005 |
| JP | 2010-161520 A | 7/2010 |
| JP | 2012-070329 A | 4/2012 |

OTHER PUBLICATIONS

Chinese Office Action for Appln. No. CN201380028447.3 dated May 8, 2017.

* cited by examiner

FIG. 1
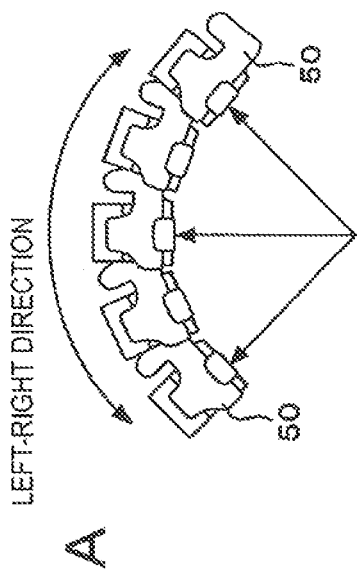
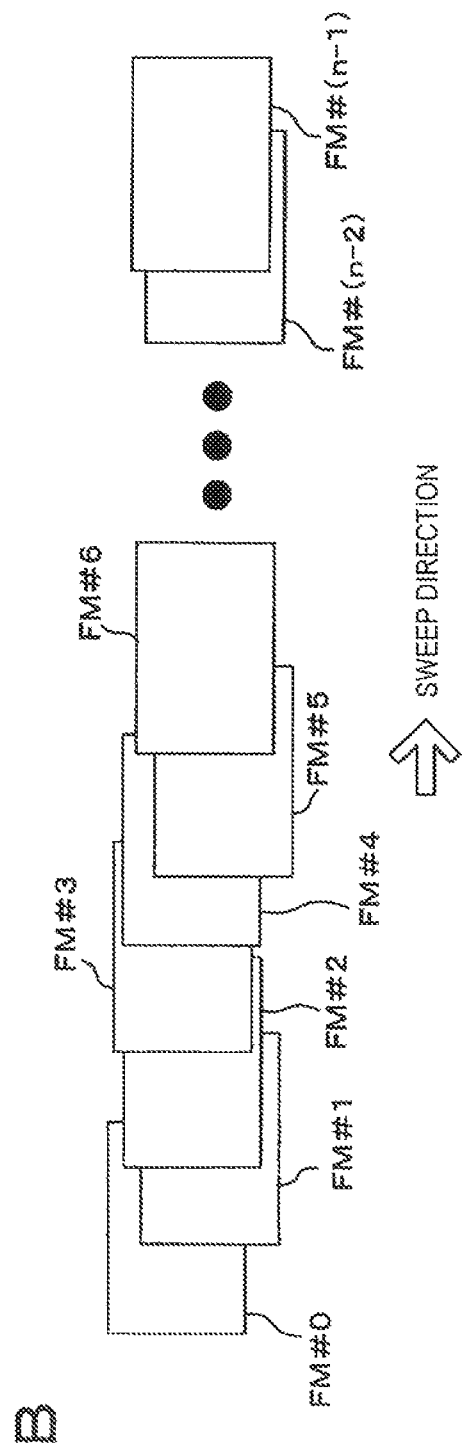

FIG. 11
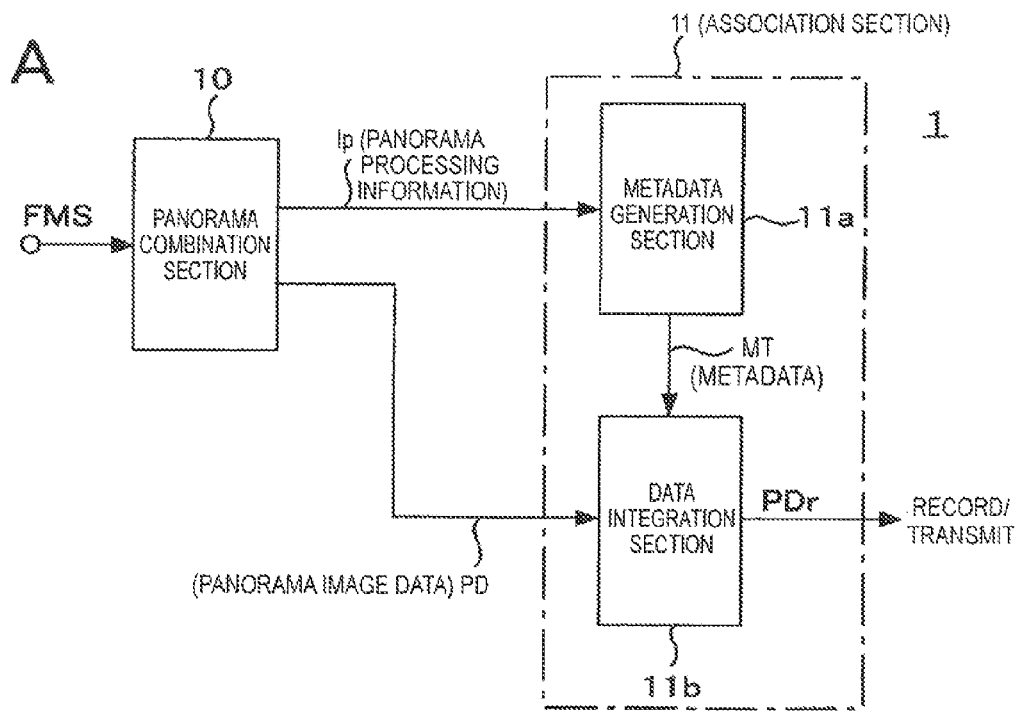
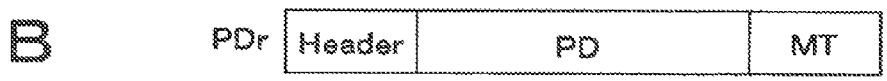
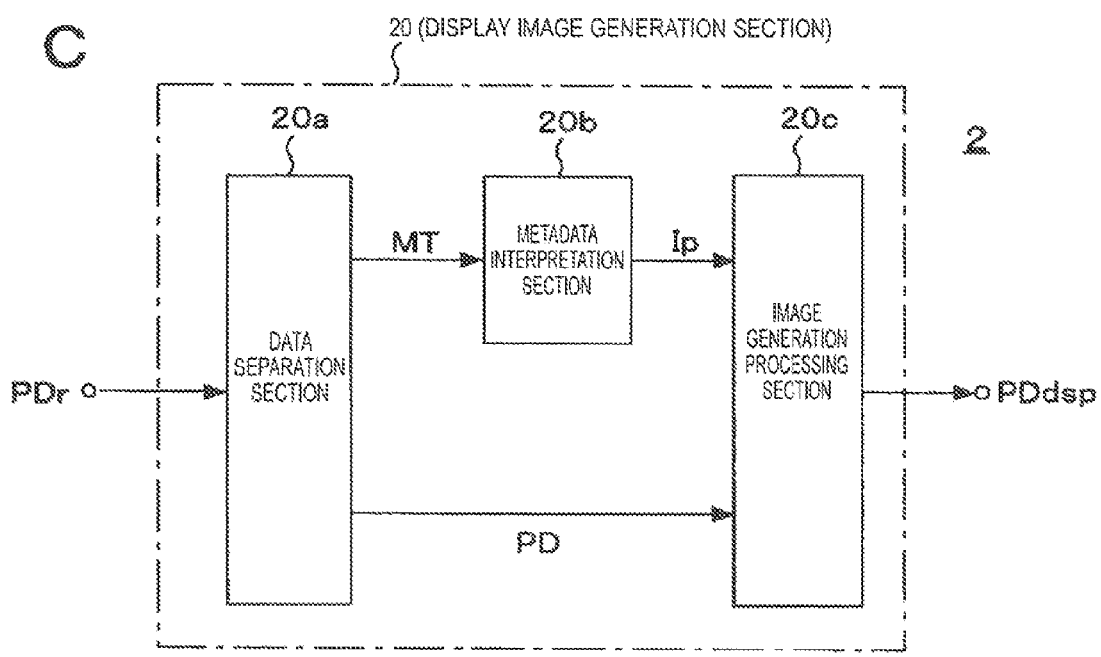

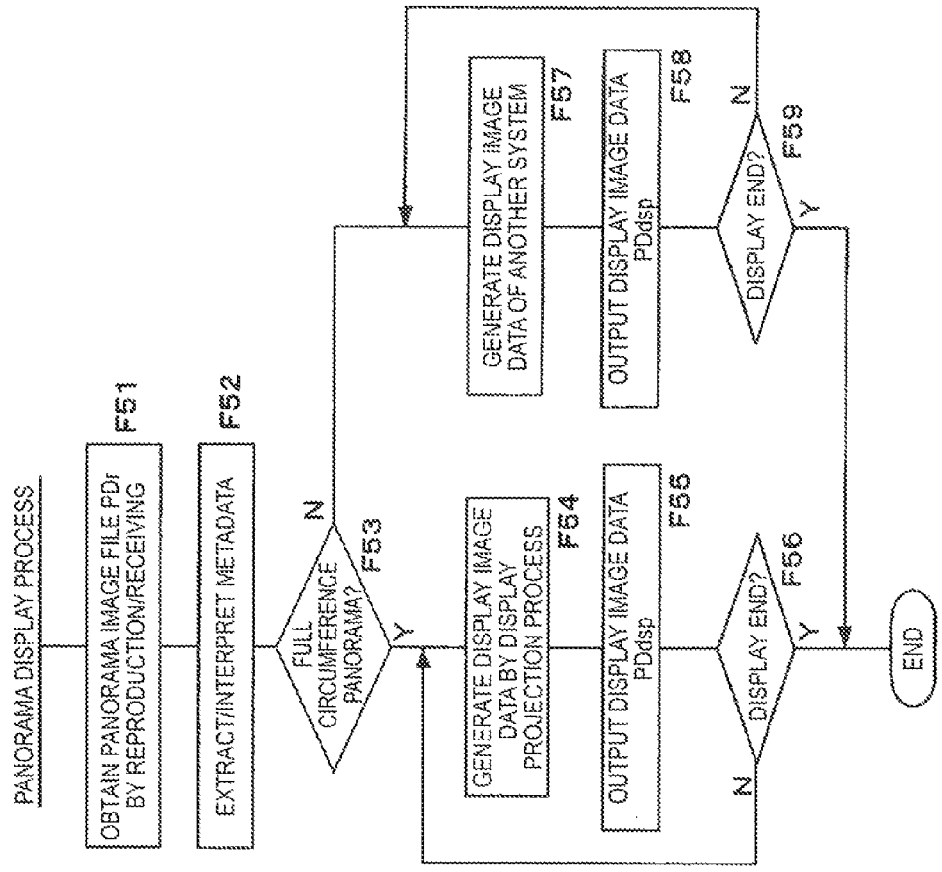
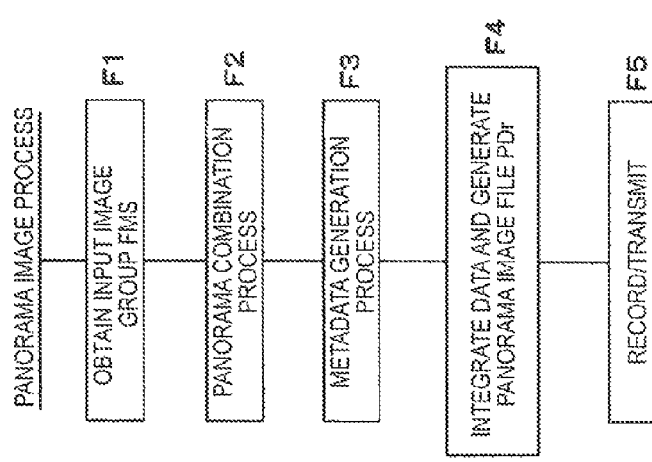
FIG. 12

FIG. 13
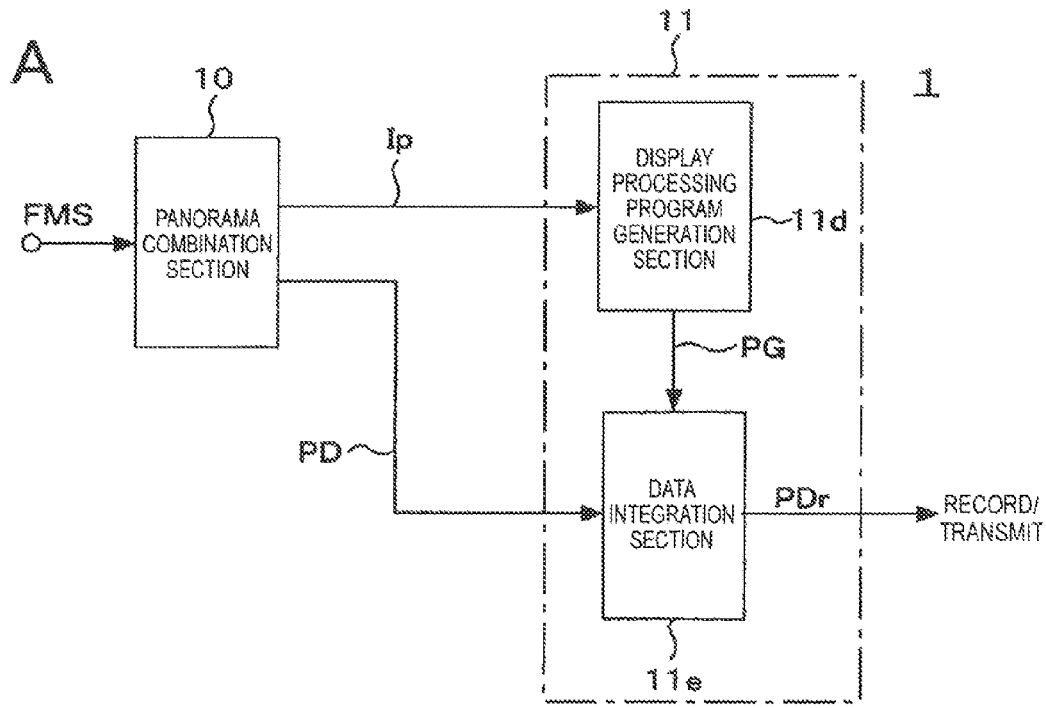
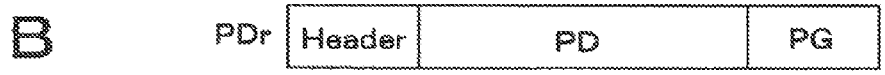
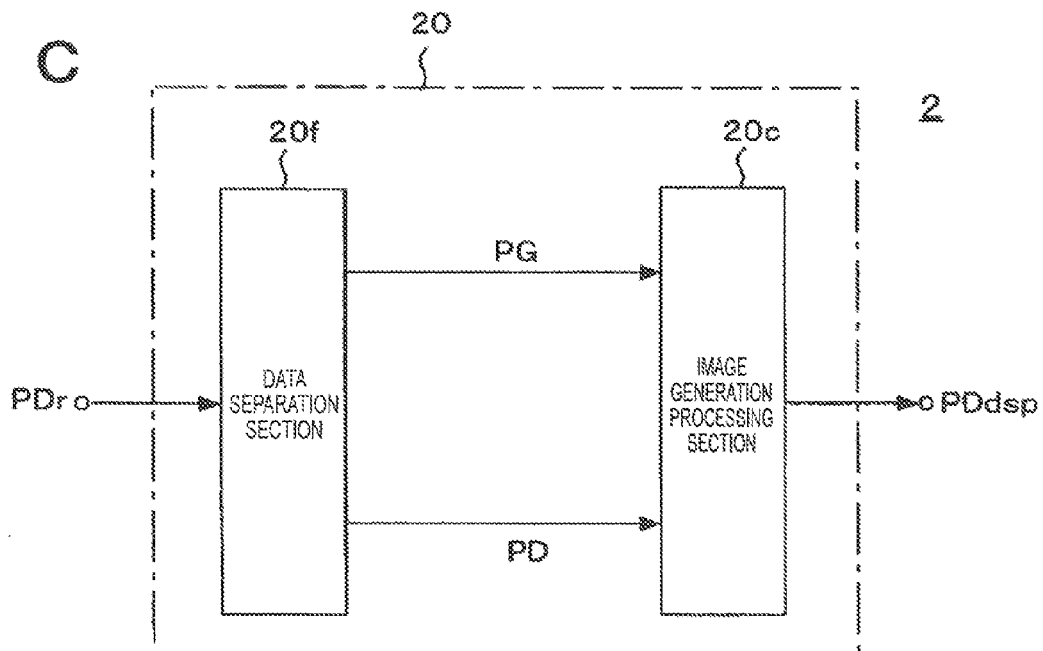

FIG. 15
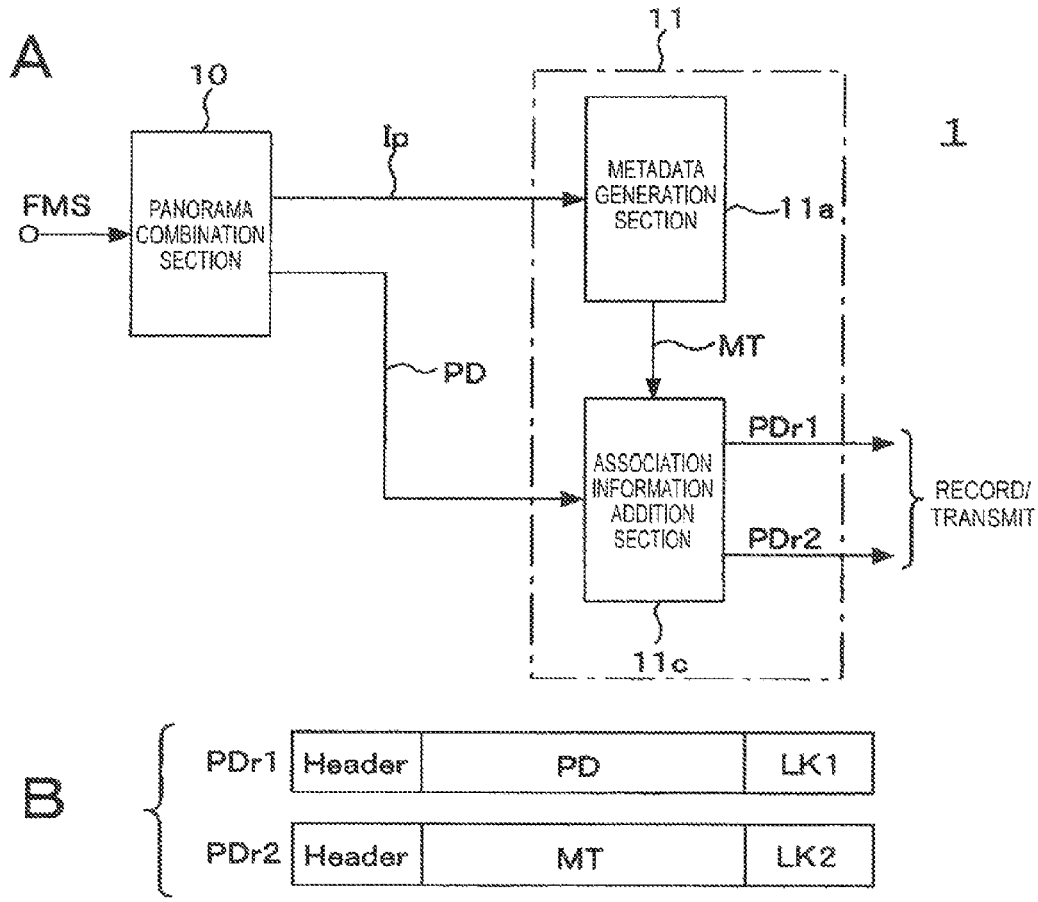
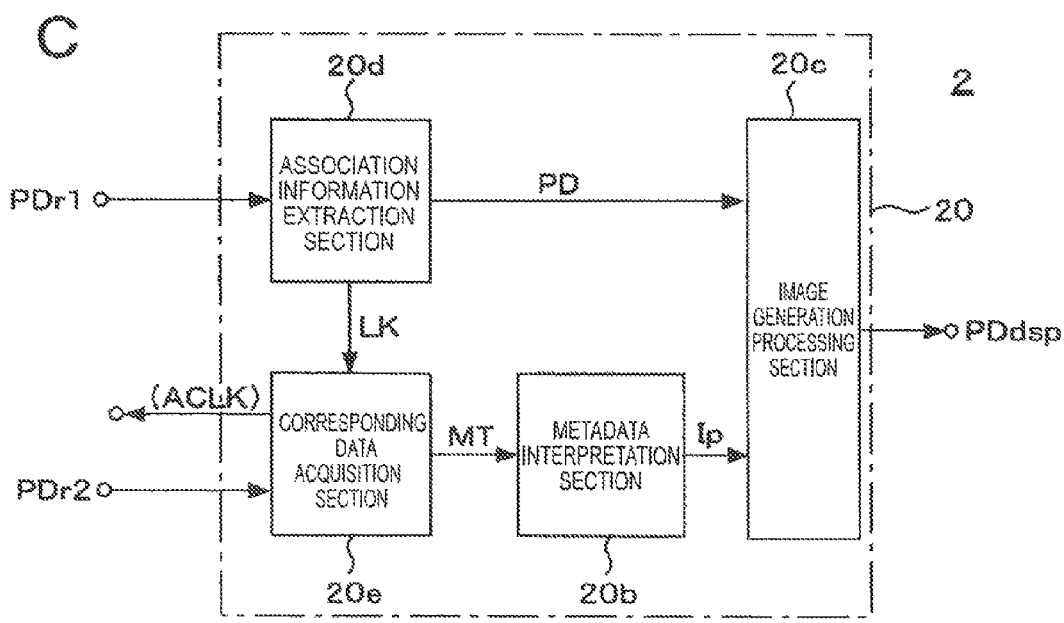

FIG. 17
A
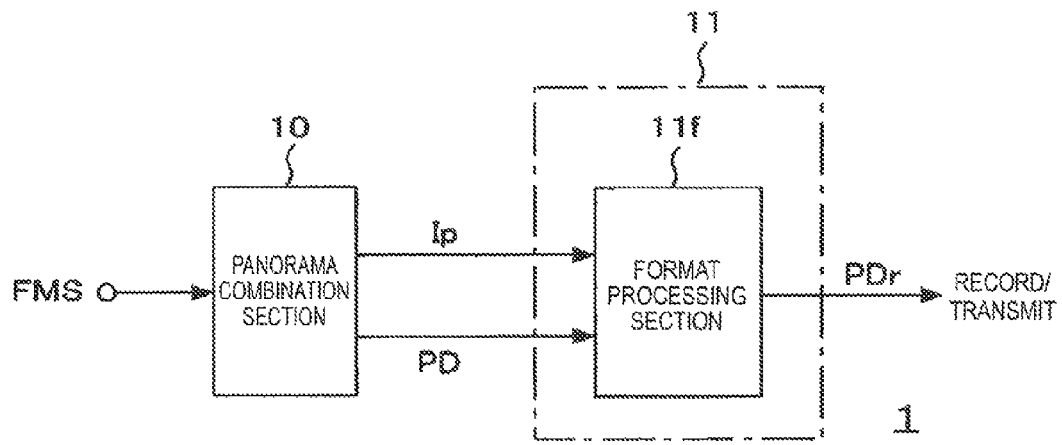
B
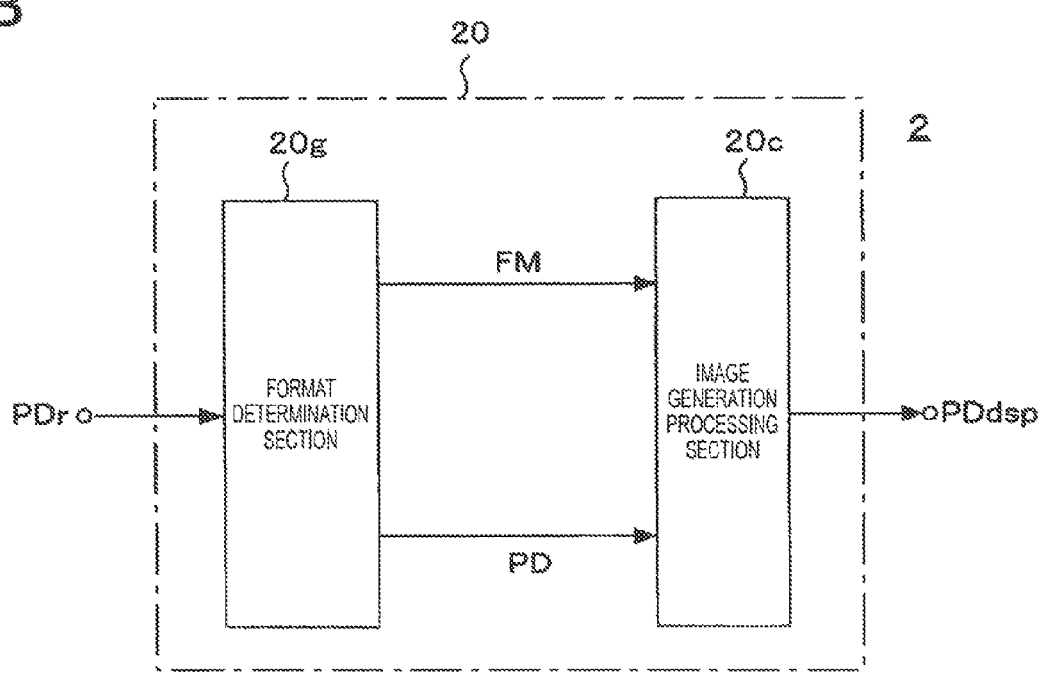

FIG. 18

A  PANORAMA IMAGE PROCESS

- F41 OBTAIN INPUT IMAGE GROUP FMs
- F42 PANORAMA COMBINATION PROCESS
- F43 CONFIRM PANORAMA PROCESSING INFORMATION
- F44 FULL CIRCUMFERENCE PANORAMA?
  - Y → F45 GENERATE PANORAMA IMAGE FILE PDr IN DEDICATED FORMAT
  - N → F46 GENERATE PANORAMA IMAGE FILE PDr IN NORMAL FORMAT
- F47 RECORD/TRANSMIT
- END

B  PANORAMA DISPLAY PROCESS

- F81 OBTAIN PANORAMA IMAGE FILE PDr BY REPRODUCTION/RECEIVING
- F82 DETERMINE FORMAT
- F83 DEDICATED FORMAT?
  - Y → F84 GENERATE DISPLAY IMAGE DATA BY DISPLAY PROJECTION PROCESS
    - F85 OUTPUT DISPLAY IMAGE DATA PDdsp
    - F86 DISPLAY END? N → F84; Y → END
  - N → F87 GENERATE DISPLAY IMAGE DATA OF ANOTHER SYSTEM
    - F88 OUTPUT DISPLAY IMAGE DATA PDdsp
    - F89 DISPLAY END? N → F87; Y → END

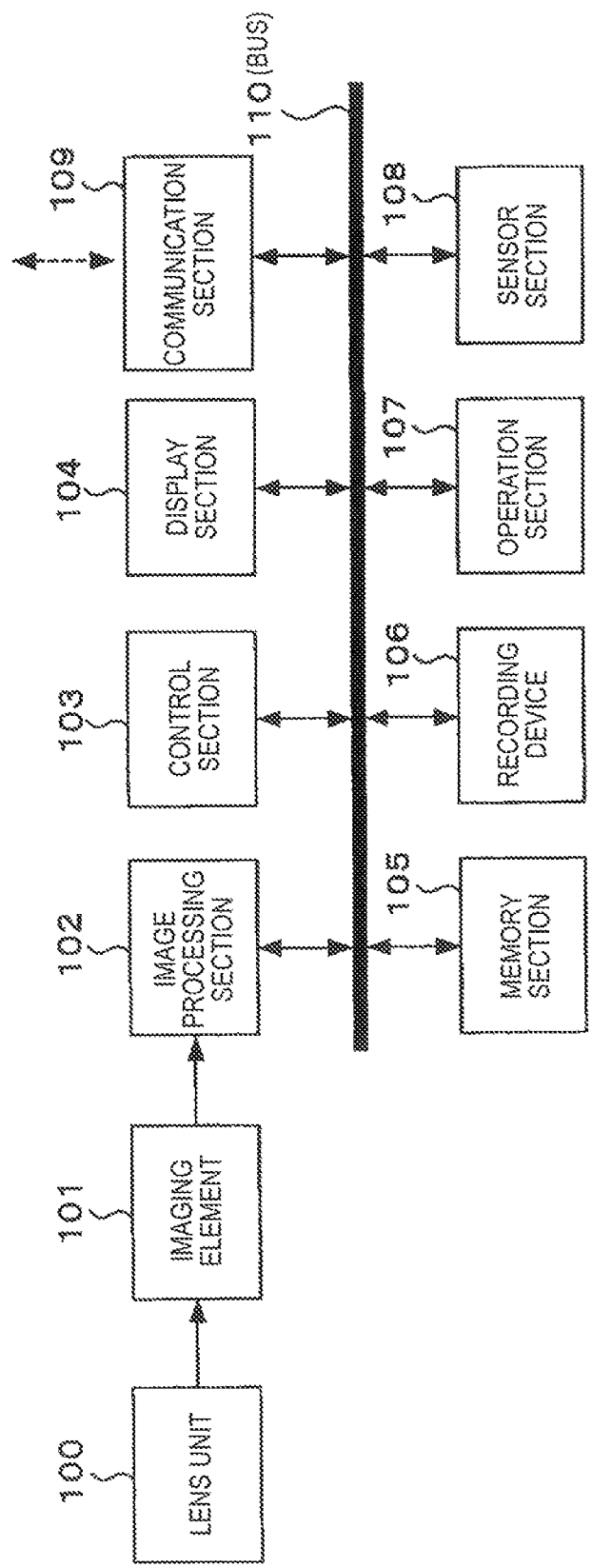

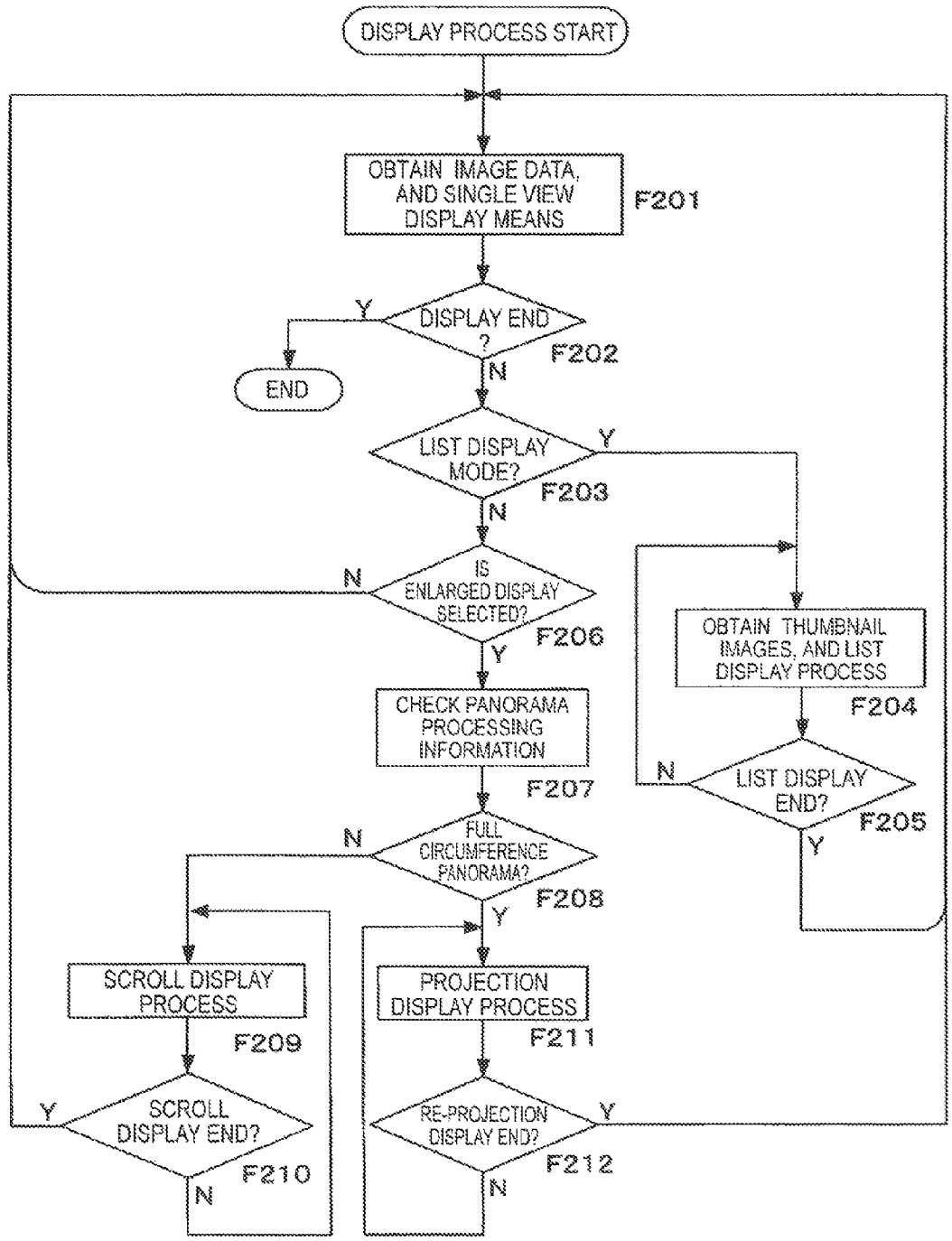

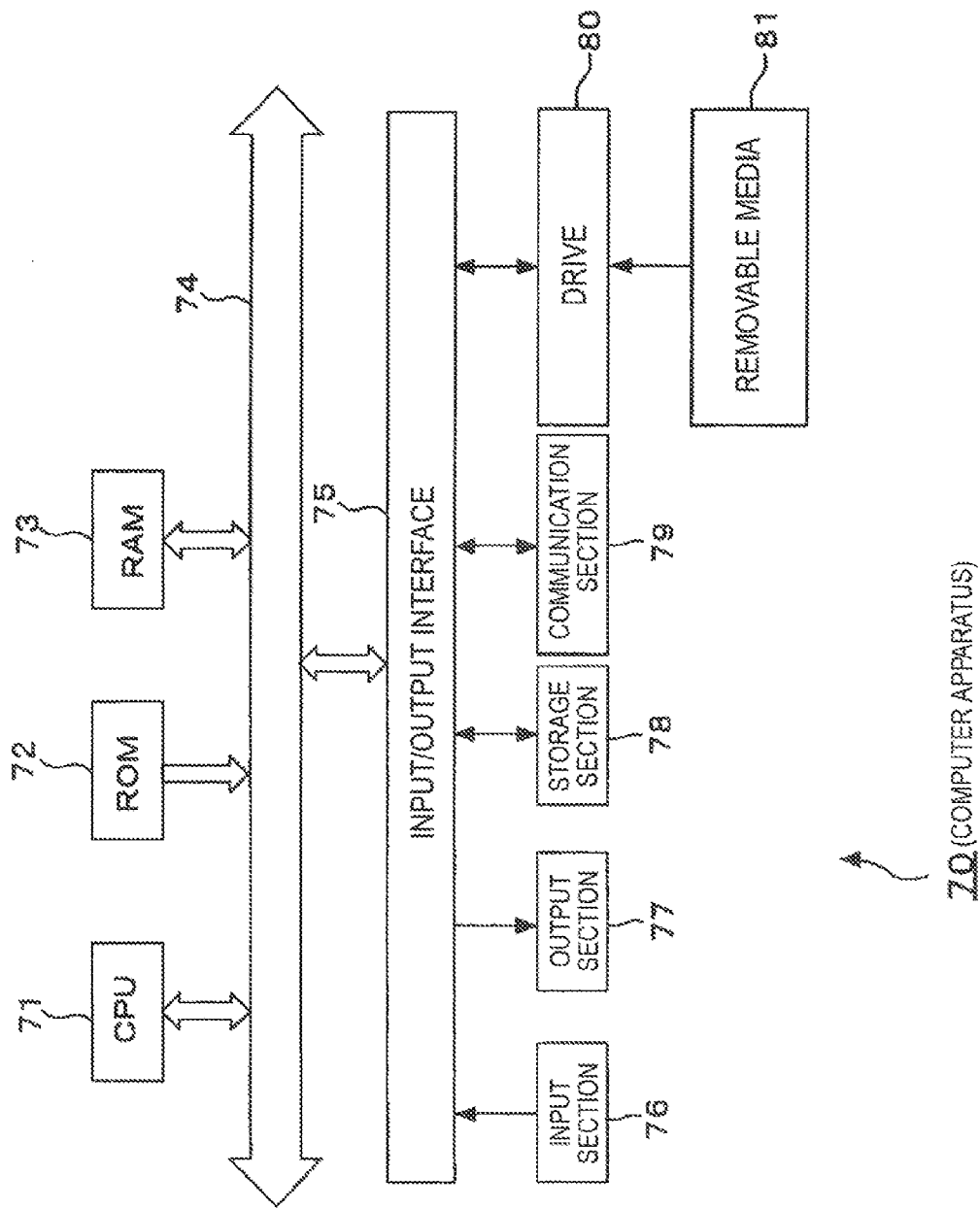

IMAGE PROCESSING APPARATUS, IMAGE PROCESSING METHOD, AND PROGRAM

CROSS-REFERENCE TO RELATED APPLICATION

The present application is a national phase entry under 35 U.S.C. § 371 of International Application No. PCT/JP2013/060182 filed Apr. 3, 2013, published on Dec. 12, 2013 as WO 2013/183346 A1, which claims priority from Japanese Patent Application No. JP 2012-129100 filed in the Japanese Patent Office on Jun. 6, 2012.

TECHNICAL FIELD

The present disclosure relates to an image processing apparatus, an image processing method, and a program for implementing these, and specifically relates to an image process appropriate for the display of panorama image data.

CITATION LIST

Patent Literature

Patent Literature 1: JP 2010-161520A

BACKGROUND ART

As shown in Patent Literature 1, an image process which generates one panorama image from a plurality of images is well known.

For example, a user obtains a large number of captured images (frame image data) while horizontally sweeping a camera, and by combining these, a so-called panorama image can be obtained.

Note that, a "sweep" is said to be the operation of imaging direction movement due to a rotational motion of an imaging apparatus at the time of imaging, in order to obtain a plurality of flame image data for panorama image generation. For example, in the case of moving an imaging direction in a horizontal direction, a sweep direction will point to the horizontal direction.

SUMMARY OF INVENTION

Technical Problem

In the case where reproduction and display is performed for a panorama image, it is common to perform a so-called single view display or to perform a scroll display.

A single view display is displaying by compressing all panorama image data as one still image. In this case, while an entire panorama image can be viewed, it will be difficult to become a powerful image due to compression.

A scroll display is displaying while scrolling by sequentially cutting out parts of panorama image data. By a scroll display, a panorama image can be viewed on a screen larger for each portion.

However, for example, a scroll display is displaying by simply sequentially cutting out, panorama image data projected onto a cylindrical surface or the like, and a scene from a user viewpoint will not necessarily be accurately reflected, such as a straight line portion being significantly curved such as the horizon or a building, for example.

On the other hand, there is a reproduction technique in which a high sense of immersion and sense of presence are obtained, by setting a panorama image projected onto a cylindrical surface or the like to a display image by re-projecting onto a plane surface screen. Such a technique of reproduction and display will be called a "projection display" in the description.

For example, QuickTime VR. An Image-Based Approach to Virtual Environment Navigation (Apple Computer, Inc. or the like is well known.

While it can be considered that the degree of satisfaction of a user who views the display of a panorama image can be improved, when using such a projection display, there will be a difficulty in the following point of simply performing a projection display instead of a scroll display.

While a viewing angle of a panorama image may be necessary in authoring for performing to projection display, there is usually little for a user to accurately know the viewing angle of a panorama image projected in a panorama mode of a digital still camera. For example, there a various types of images, such as a full circumference image with a 360° viewing angle, from an image with a viewing angle of approximately 120° or an image with a viewing angle of approximately 180°, in a panorama image. Also, apart from a 360° viewing angle, this calculation for obtaining a viewing angle from panorama image data will become inaccurate due to influences such as alignment errors, the sweep radius or distortion aberrations, and an accurate viewing angle will not be able to be obtained.

In this way, a viewing angle will not be known by only panorama image data, and authoring of a projection display will not be able to be performed. For example, to ensure that a viewing angle for a projection display is known, it may be necessary for a user to roughly estimate a viewing angle at the time of panorama imaging, and to manually input the viewing angle at the time of authoring. This will become a difficult operation for an ordinary user. Further, when an input viewing angle is significantly different than an actual one, it will result in distortions occurring in a projection display image.

From this, a projection display will not necessarily always be an optimum display system from the viewpoint of actual use or from the viewpoint of display quality.

The present disclosure aims to implement an image process in order to be able to manually and accurately execute a display of a panorama image, in particular, a high-quality projection display, for example, by widely assuming from specialist use or business use up to a device for a general consumer.

Solution to Problem

An image processing apparatus according to the present disclosure includes an association section configured to, in a case where panorama image data generated by using a plurality of frame image data obtained by an imaging operation while displacing an imaging direction is determined to be a full circumference panorama image, associate the panorama image data with information showing that the panorama image data is the full circumference panorama image.

An image processing method according to the present disclosure includes performing a process which, in a case where panorama image data generated by using a plurality of frame image data obtained by an imaging operation while displacing an imaging direction is determined to be a full circumference panorama image, associates the panorama image data with information showing that the panorama image data is the full circumference panorama image.

A program according to the present disclosure causes a calculation processing apparatus to execute the process of the image processing method.

In such a present disclosure, information in which it is determined whether or not it is a full circumference panorama image, such as when reproduced and displayed, is added to panorama image data combined and generated from a plurality of frame image data. That is, in the case where at least some panorama image data is determined to be a full circumference panorama image, information which shows it is a full circumference panorama image is associated with this panorama image data. In this way, for example, a display processing, system can be selected, according to whether or not it is a hill circumference panorama image, when performing subsequent reproduction and display.

Here, there will be cases where a full circumference panorama image can be determined to have a viewing angle of 360° (for approximately 360°). That is, there will be cases where a viewing angle can be fixed, when performing a projection display.

Advantageous Effects of Invention

According to the present disclosure, in the case where panorama image data is a full circumference panorama image, information which shows this will be associated. Therefore, it will have an effect in which an appropriate display processing system can be selected, according to whether or not it is a full circumference panorama image, when performing reproduction and display. For example, in the case of a full circumference panorama image, it becomes possible to execute an appropriate projection display or the like, by setting a viewing angle to 360°.

BRIEF DESCRIPTION OF DRAWINGS

FIG. 1 is an explanatory diagram of panorama imaging performed in an embodiment of the present disclosure.

FIG. 11 is an explanatory diagram of a first configuration example of an embodiment.

FIG. 12 is a flow chart of processes in the first configuration example of an embodiment.

FIG. 13 is an explanatory diagram of a second configuration example of an embodiment.

FIG. 15 is an explanatory diagram of a third configuration example of an embodiment.

FIG. 17 is an explanatory diagram of a fourth configuration example of an embodiment.

FIG. 18 is a flow chart of processes in the fourth configuration example of an embodiment.

FIG. 19 is a block diagram of an imaging apparatus of a fifth configuration example of an embodiment.

FIG. 27 is a flow chart of a display process of an embodiment.

FIG. 28 is a block diagram of a computer apparatus of an embodiment.

DESCRIPTION OF EMBODIMENTS

Figure 2:
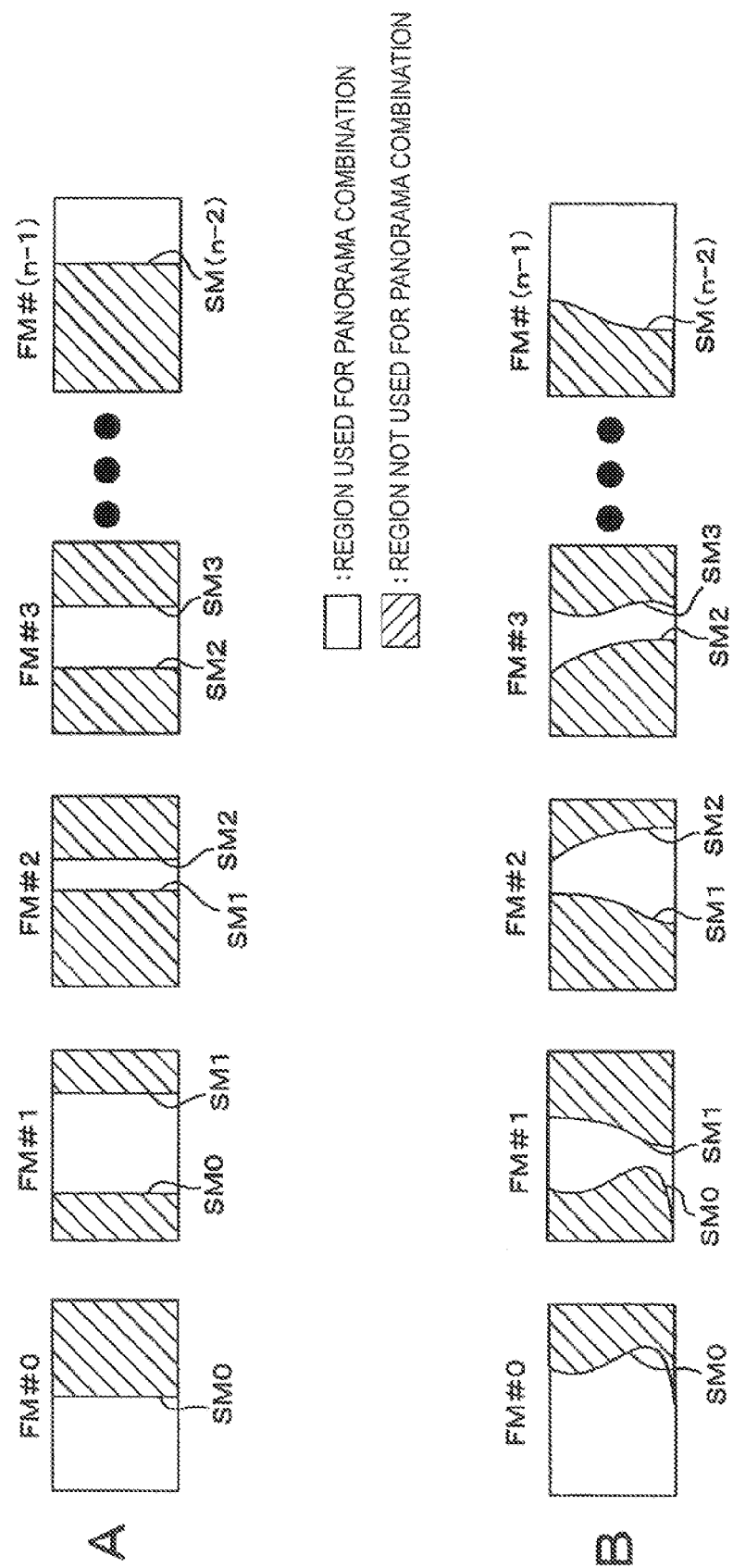
FIG. 2 is an explanatory diagram of panorama image combination performed in an embodiment.

Hereinafter, the embodiments will be described in the following order.

Note that, a device having at least the association section 11 in the embodiments will become the image processing apparatus in the claims.

<1. Outline of panorama combination and reproduction display>
<2. Image processing apparatus configuration examples>
<3. First configuration example (metadata)>
<4. Second configuration example (dedicated program)>
<5. Third configuration example (file link information)>
<6. Fourth configuration example (dedicated format)>
<7. Fifth configuration example (application example to an imaging apparatus)>
  (7-1: Configuration of the imaging apparatus)
  (7-2: Panorama combination and association processes)
  (7-3: Panorama image display)
<8. Sixth configuration example (application example to a computer apparatus and program)>
<9. Modified example>

<1. Outline of Panorama Combination and Reproduction Display>

First, an outline of panorama combination will be described.

An imaging apparatus 50 of an embodiment, which will be described later, or a general imaging apparatus of recent years (a digital still camera), can generate a panorama image by performing a combination process for a plurality of still images (frame image data) obtained by a photographer who is performing imaging while rotatably moving the imaging apparatus 50 around some rotation axis.

In particular, a full circumference panorama image with a viewing angle of 360° can be generated by the imaging apparatus 50 of an embodiment.

FIG. 1A shows the movement of the imaging apparatus 50 at the time of panorama imaging. Since unnaturalness of junctions will occur when parallaxes of the background and foreground are combined at the time of panorama imaging, it is desirable for a rotation center at the time of imaging to be set to a rotation center of a point specific to a lens, at which parallax called nodal point (Nodal Point) is does not occur. Rotational movement of the imaging apparatus 50 at the time of panorama imaging will be called a "sweep".

FIG. 1B is a schematic diagram at the time when an appropriate alignment is performed for a plurality of still images obtained by a sweep of the imaging apparatus 50. In this figure, each still image obtained by imaging is shown in a time sequence of imaging. That is, frame image data captured from a time 0 up to a time (n–1) is set to frame image data FM#0, FM#1 . . . FM#(n–1).

In the case where a panorama image is generated from n still images, a combination process is performed for a series of n frame image data FM#0 to FM#(n–1) continuously captured such as that illustrated.

As shown in this FIG. 1B, since it may be necessary for each captured frame image data to have overlapping portions with adjacent frame image data, it is necessary for an imaging time interval of each frame image data of the imaging apparatus 50, and an upper-limit value of a speed at which a photographer performs a sweep, to be appropriately set.

Also, since a frame image data group aligned in this way will have many overlapping portions, it may be necessary to determine a region to be used for a final panorama image for each frame image data. In other words, this is the same as determining a junction (seam: seam) of images in a panorama combination process.

In FIG. 2A and FIG. 2B, examples of seams SM are shown.

In a seam, it can be set to a vertical straight line in a sweep direction such as shown in FIG. 2A, or a non-straight line (curved line or the like) such as shown in FIG. 2B.

In this FIG. 2A and FIG. 2B, a seam SM0 is shown as a junction between frame image data FM#0 and FM#1, a seam SM1 is shown as a junction between frame image data FM#1 and FM#2, and a seam SM(n–2) is shown as a junction between frame image data FM#(n–2) and FM#(n–1).

Note that by having these seams SM0 to SM(n–2) set to junctions between adjacent images at the time of combining, the portions which have been made shaded parts in each frame image data will become image regions which are not used for a final panorama image.

Further, when performing panorama combination, an objective is set for reducing unnaturalness of images in the vicinity of the seams, and there will be cases where blend processing is also performed for image regions in the vicinity of the seams. Also, there will be cases where common portions of each frame image data are connected by blend processing in a wide range, or there will be cases where pixels contributing to the panorama image are selected for each pixel from the common portions, and in these cases, while junctions will clearly be present, these wide range connection portions will have the same appearance as seams for the present disclosure.

Further, as shown in FIG. 1B, as a result of the alignment of each frame image data, some movement will be recognized not only in the general sweep direction, but also in a direction perpendicular to that of the sweep. There will be gaps occurring by this due to camera shake of a photographer at the time of the sweep.

Figure 3:
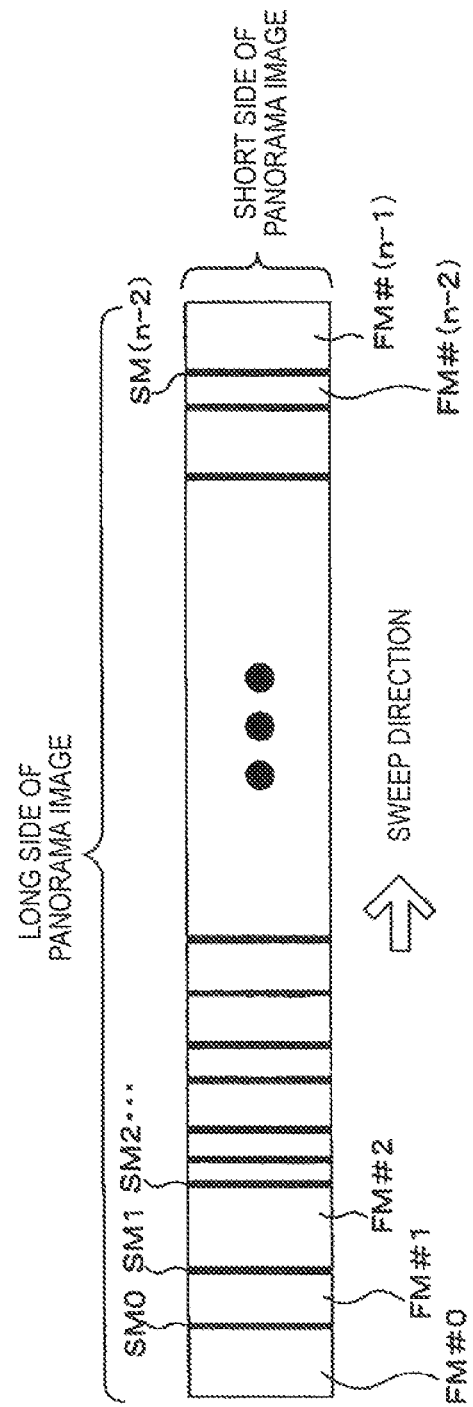
FIG. 3 is an explanatory diagram of a panorama image of an embodiment.

By determining the seams of each frame image data, performing connections by connection or blend processing at these boundary regions, and finally trimming unnecessary portions in a direction perpendicular to that of a sweep by considering a camera shake amount, a panorama image with a wide viewing angle can be obtained, with a sweep direction set to a long side direction, such as shown in FIG. 3.

In FIG. 3, vertical lines show seams, and a state is schematically shown in which a panorama image is generated by respectively connecting n frame image data FM#0 to FM#(n–1) at seams SM0 to SM(n–2).

A specific operation example of panorama imaging, which is performed by a user for obtaining such a panorama image by using the imaging apparatus 50, will be described.

First to begin with, the imaging apparatus 50 is set to a panorama imaging mode, and a maximum image viewing angle is additionally set. For example, 120°, 180°, 360° or the like is capable of being set as the maximum image viewing angle, and in the case where 360° is selected, so-called full circumference imaging can be performed which stores an entire scene of the surroundings for all photographs. Note that, an expression such as "360° panorama imaging mode" is used in the case where the maximum image viewing angle is set to 360° in the panorama imaging mode, and an expression such as "180° panorama imaging mode" is used in the case where the maximum image viewing angle is set to 180°.

Next, panorama imaging is started, by having a photographer press a shutter button of the imaging apparatus 50, and a sweep operation is performed. Afterwards, in the case where end conditions of panorama imaging are satisfied, the panorama imaging will be completed. For example, the end conditions are as follows.

The case of reaching a maximum image viewing angle set in advance.
The case of the sweep operation being stopped by a user.
The case of a user pressing the shutter button again.
The case of as user removing a finger from the shutter button (for a specification of continuing to press the shutter button during, panorama imaging).
The case of some error occurring.

After imaging is completed, a panorama combination process is automatically started, a combination of a panorama image is completed after a certain time has elapsed, and this panorama image data is held in a recording device. Afterwards, a list is usually made the same as that of the still images, and can be displayed.

Generated panorama image data such as this and a display mode of this will be described.

Figure 4:
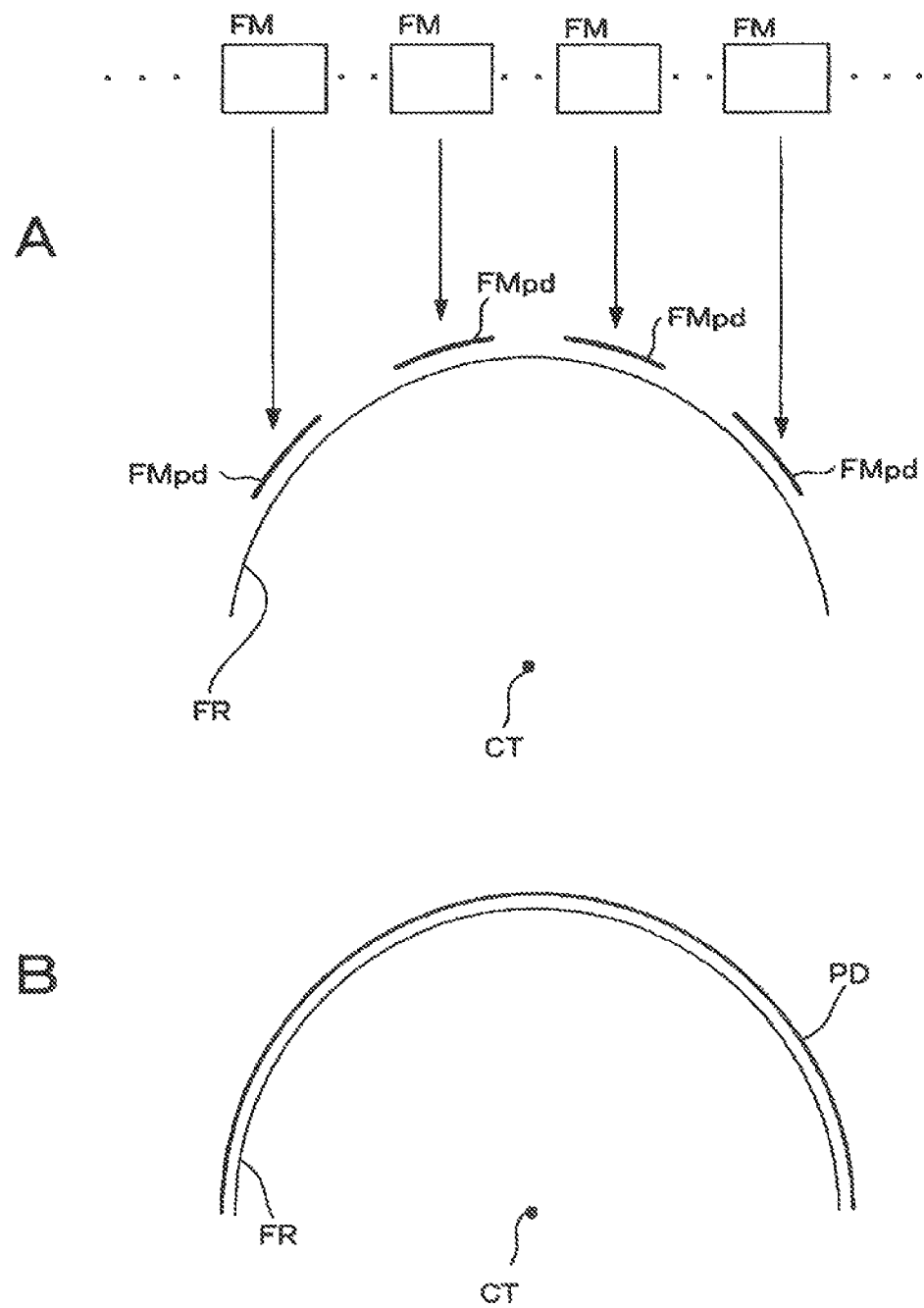
FIG. 4 is an explanatory diagram of a combination projection process and a display projection process of an embodiment.

FIG. 4A is a schematic diagram of a projection process at the time of panorama combination. While the processing systems at the time of panorama it) combination are diverse, a process is often performed, for example, which projects onto a cylindrical surface, a spherical surface, a cube or the like. This will be called a "combination projection process" in the description, and is distinguished from a "display projection process" which is performed for a projection display, which will be described later.

In this FIG. 4A, a large amount of frame image data FM, which is captured while sweeping at the time of panorama imaging, is shown. It can be said that frame image data FM, that is, a captured image the same as that of normal photographing, projects a three-dimensional scene onto a plane surface (for example, an imager plane surface of a camera). When panorama image data such as that of FIG. 3 is generated from such a large amount of frame image data FM, a state will be set in which each frame image data FM is projected onto a cylindrical surface FR, for example, as a combination projection process. In this diagram, projected frame image data FMpd is schematically shown along a cylindrical surface FR.

Panorama image data PD such as that of FIG. 4B is generated by connecting the frame image data FMpd to which such a combination projection process has been performed. The panorama image data PD can be image data to which projection has been performed again on the cylindrical surface FR as seen from a projection center CT.

In the present embodiment, a single view display, a list display, a scroll display and a projection display are capable of being executed as display modes for such panorama image data PD. The display modes are illustrate (in FIG. 5, FIG. 6 and FIG. 7.

Figure 5:
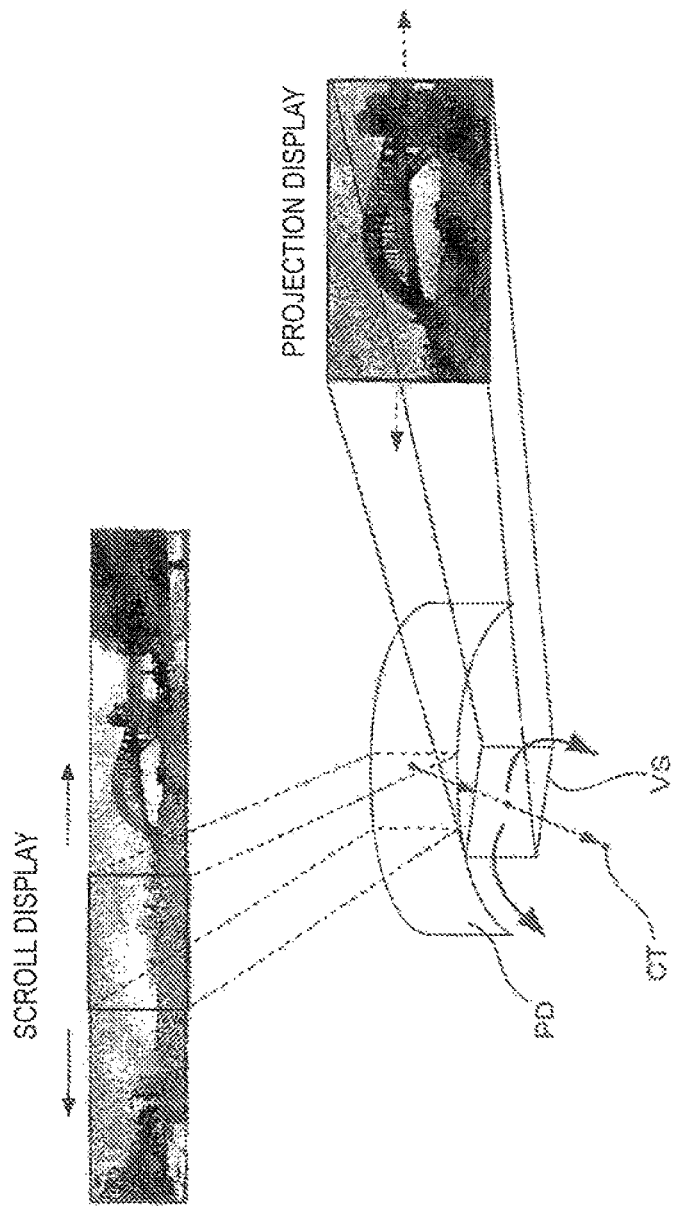
FIG. 5 is an explanatory diagram of a scroll display and a projection display of an embodiment.

FIG. 5 schematically shows the concepts of a scroll display and a projection display.

A scroll display cuts out parts of the panorama image data PD, which is an image projected onto a cylindrical surface or the like such as that described above, as they are, and displays by scrolling up, down, left and right automatically or in accordance with a manual operation.

On the other hand, a projection display is different to that of a scroll display, and displays an image to which projection (a display projection process) is performed again onto a virtual plane surface screen VS for panorama image data PD projected onto a cylindrical surface, a spherical surface, cube or the like.

That is, in this case, a process is performed which projects, onto a plane surface, panorama image data projected onto a projection surface at the time of panorama image generation as a display projection process. Also, an image projected onto a plane surface is set to display image data.

In this way, an image at the time of imaging can be reproduced, projection distortions caused by cylindrical projection or spherical surface projection as seen from a scroll display are eliminated, and a display with an improved sense of immersion and sense of presence is achieved.

Figure 6:
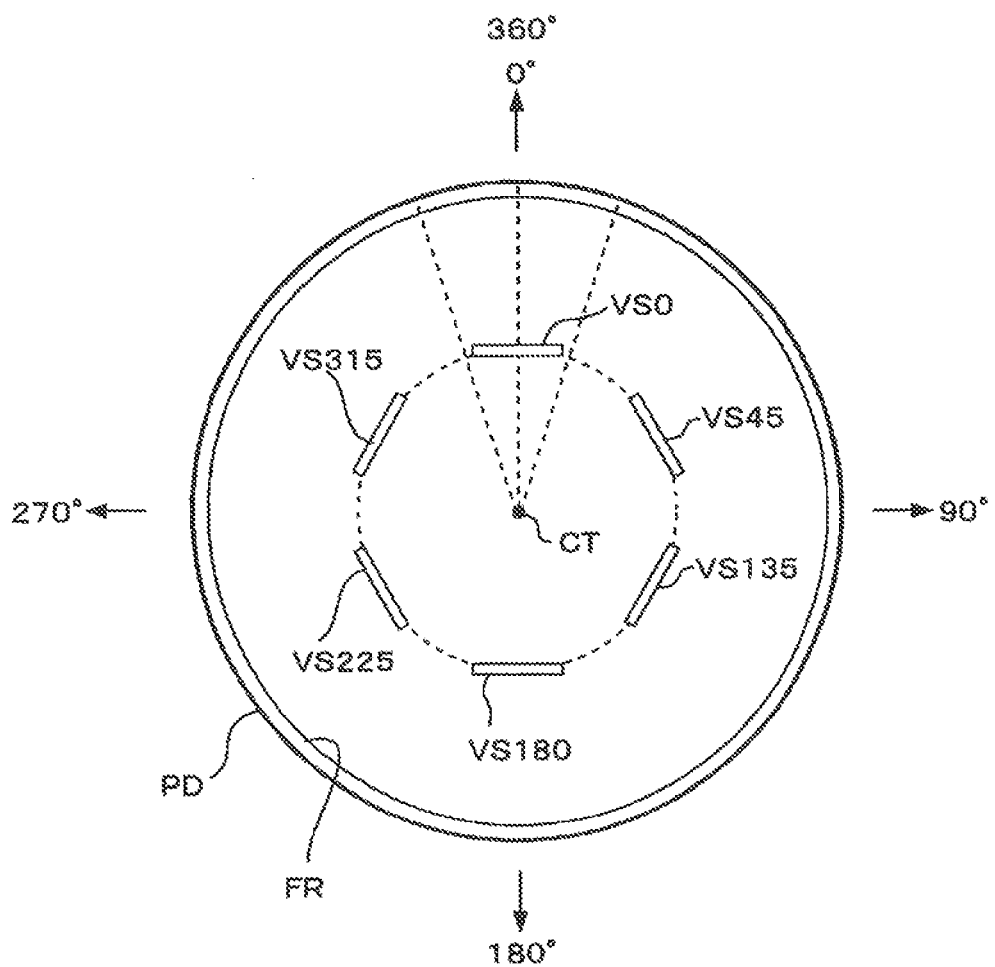
FIG. 6 is an explanatory diagram of a projection display of a 360° panorama image of an embodiment.
Figure 7:
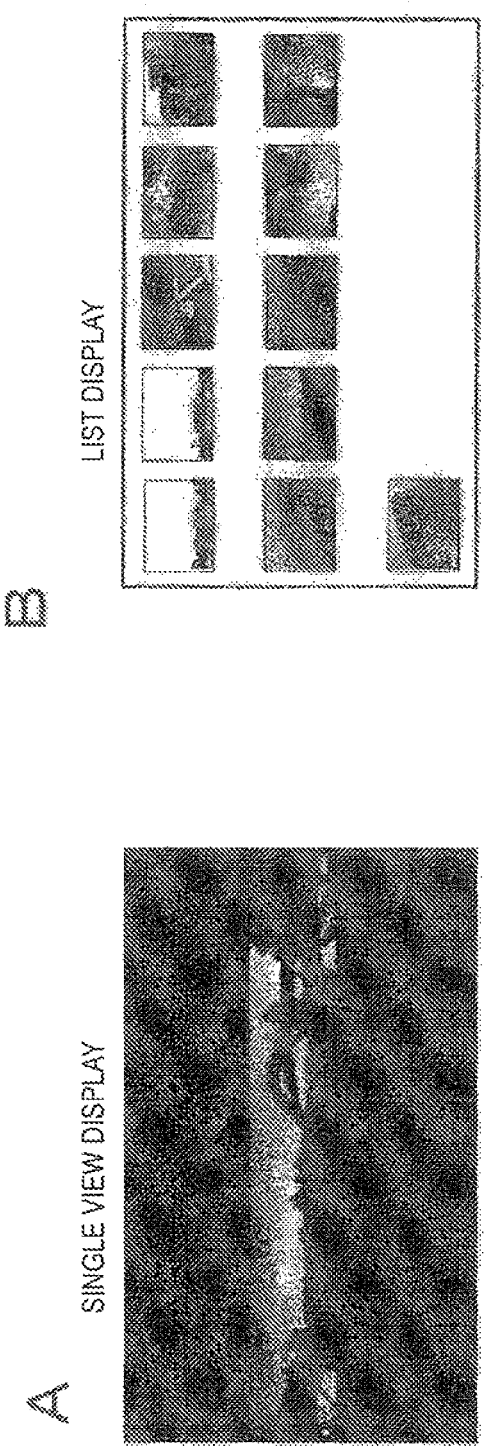
FIG. 7 is an explanatory diagram of a single view display and a list display of an embodiment.

For example, FIG. 6 schematically shows a projection display of panorama image data PD obtained in a 360° panorama imaging mode. Panorama image data PD is image data projected onto a 360° cylindrical surface FR of the surroundings of a projection center CT. This panorama image data PD is projected onto virtual plane surface screens VSO . . . VS45 or the like corresponding to each angle. For example, the plane surface screen VSO is shown as a plane surface screen centered on a 0° direction from the projection center CT, and the plane surface screen VS45 is shown as a plane surface screen centered on a 45° direction from the projection center CT. In the figure, each of the plane surface screens VS135, VS180, VS225 and VS315 of the 135° direction, the 180° direction, the 225° direction and the 315° direction are additionally illustrated.

In a projection display, an image projected onto the plane surface screen VS set to such a viewing direction from the projection center CT is displayed. By appropriately setting a vector or distance from the projection center CT to the plane surface screen VS automatically or in accordance with a manual operation, a change of viewing direction or a zoom-in/zoom-out are possible.

For example, if a projection image of the plane surface screen VSO, and projection images of the plane surface screen VS1 (1° direction), the plane surface screen VS2 (2° direction) the plane surface screen VS45 . . . the plane surface screen VS135 the plane surface screen VS315 . . . and the plane surface screen VS0 are sequentially displayed, it becomes possible to display so as to look over the full circumference the surroundings from the projection center CT.

Further, the display image will be zoomed-in/zoomed-out, by moving the position of the plane surface screen VS far from the projection center CT or bringing it close to the projection center CT.

However, apart from a full circumference panorama image captured in a 360° panorama imaging mode, a viewing angle of panorama image data will not be able to be accurately obtained. Also, a three-dimensional model at the time of performing a display projection process will not able to be strictly defined. Accordingly, that other than 360° panorama image data will not be appropriate for a projection display.

Next, FIG. 7A shows an example of a single view display, and FIG. 7B shows an example of a list display.

Since a single view display generates display image data which simply includes all the panorama image data PD, and displays this, it is a normal display operation. For example, by having a panorama image become a horizontally long image, and combining it with a different aspect ratio of a display screen, parts on the screen such as shown in FIG. 7A (in the case of this example, an upper region and a lower region) will often become regions which are not displayed.

As shown in FIG. 7B, a list display displays image data capable of being reproduced and displayed in a list. For example, by having a user perform image specification in a list display, panorama image data PD to which the above described scroll display or projection process is performed can be selected.

Note that, for example, while the images of the list display of FIG. 7B are not images in which entire horizontally long panorama images are compressed, in the case where panorama image data PD is represented in a list display, parts of a panorama image may be cut out and compressed, and a display may be performed such as that illustrated. It goes without saying, for example, that there will also be list display modes such as a plurality side by side, by compressing the entire horizontally long panorama images.

<2. Image Processing Apparatus Configuration Examples>

Configuration examples of an image processing apparatus of an embodiment will be described.

FIG. 8A shows a configuration example having an image processing apparatus 1, which includes an association section 11 for generated panorama image data, and a panorama combination section 10. The association section 11 and the panorama combination section 10 may be included in one body within a same device, or may be each included in different device bodies.

Further, FIG. 8B shows a configuration example having an image processing apparatus 2, which includes a display image generation section 20 for displaying panorama image data, and a display section 21. The display image generation section 20 and the display section 21 may be included in one body within a same device, or may be each included in different device bodies.

In the configuration of FIG. 8A, the panorama combination section 10 generates panorama image data PD from an input image group FMS. The input image group FMS is a series of frame image data FM obtained by having a photographer perform an imaging operation while sweeping in a panorama imaging mode. The panorama combination section 10 generates panorama image data PD such as that described above in FIG. 1 to FIG. 3, by using a plurality of frame image data FM as the input image group FMS.

Then, the panorama combination section 10 supplies the generated panorama image data PD to the association section 11. Note that, a detailed processing example of the panorama combination section 10 will be stated in the description of a fifth configuration example of an embodiment.

Further, the panorama combination section 10 also supplies various types of panorama processing information Ip to the association section 11 in the generation process of the panorama image data PD.

Panorama processing information Ip is the generic name for the various types of information generated in the processes of the panorama combination process.

For example, information which shows a mode type such as a 360° panorama imaging mode or a 180° panorama imaging mode (hereinafter, panorama mode type information) can be considered as the content of the panorama processing information Ip.

Further, information which shows a determination result of whether or not the panorama image data PD has a 360° viewing angle (hereinafter, 360° viewing angle determination information) can be considered as die content of the panorama processing information Ip. For example, it is information of a result in which it is determined whether or not it is an exactly 360° viewing angle. Note that, it may be a result in which it is determined to have a roughly approximate 360° viewing angle.

Further, information which shows whether or not the panorama image data PD has a 360° viewing angle, and that a both end alignment is performed (hereinafter, both end alignment information) can be considered as the content of the panorama processing information Ip. While both end alignment will be stated in the description of a fifth configuration example of an embodiment, it can be simply said that it is a process which performs an adjustment so that there are no image gaps in the vertical direction and the horizontal direction at the 0° and 360° positions of the panorama image, that is, at both ends of the panorama image.

Further, information of a projection surface of a combination projection process (hereinafter, combination projection surface information) can be considered as the content of the panorama processing information Ip. For example, it is information which shows a cylindrical surface, a spherical surface, a polygonal surface, a plane surface or the like.

Further, information which shows a horizontal viewing angle and a vertical viewing angle of the panorama image data PD (hereinafter, horizontal and vertical viewing angle information) can be considered as the content of the panorama processing information.

In the case where the generated panorama image data PD is determined to be a full circumference panorama image, the association section 11 performs a process (association process) which associates this panorama image data PD with information with shows that this panorama image data PD is a full circumference panorama image. Specific process examples, as the association process, will be described in a first configuration example to a fourth configuration example of an embodiment.

Also, the association section 11 outputs panorama image data for recording or transmitting. In order for a distinction in the description, panorama image data for recording or transmitting, which is output by the association section 11, will be called, in particular, "a panorama image file PDr".

This panorama image file PDr is panorama image data which is recorded to a recording medium or is transmitted to another device. In particular, in the case where the panorama image data PD has an approximately 360° viewing angle for an exactly 360° viewing angle), there will be one or a plurality of data files of a state in which information which shows it is a full circumference panorama image is associated.

To continue, in the configuration of FIG. 8B, the display image generation section 20 obtains the panorama image file PDr.

For example, the panorama image file PDr recorded to a recording medium by being output from the above described association section 11 is supplied to the display image generation section 20 by being read from the recording medium. Alternatively, the panorama image file PDr transmitted and output by being output from the association section 11 is supplied to the display image generation section 20 by being received.

For example, the display image generation section 20 generates display image data PDdsp for the above described single view display, list display, scroll display or projection display. In particular, in the case where a panorama image of the panorama image file PDr selected as a display target is determined to be a full circumference panorama image, display image data PDdsp for a projection display is generated by performing a display projection process.

Also, the display image generation section 20 supplies the display image data PDdsp to the display section 21. Specific process examples of the display image generation section 20 will be described in the first configuration example to the fourth configuration example of an embodiment.

The display section 21 has display panel such as a liquid crystal panel, an organic Electroluminescence (EL) panel, a plasma display panel or a Cathode Ray Tube (CRT), and a display drive section for this display panel, and performs various types of display. By having the display image data PDdsp supplied from the display image generation section 20a, a display operation based on this display image data PDdsp is executed in this display section 21. For example, a single view display, a list display, a scroll display or a projection display related, to a panorama image is performed.

In the case of the present example, in the case where a panorama image of the panorama image file PDr selected as a display target is determined to be a full circumference panorama image, display image data PDdsp is generated by performing a display projection process by the display image generation section 20, and is supplied to the display section 21. For example, images projected onto the virtual plane surface screen VS of FIG. 6 are sequentially supplied, and in this case, a projection display is executed by the display section 21.

Various types of configuration examples can be considered as an electronic device which has the image processing apparatus 1, which includes the association section 11, and the image processing apparatus 2, which includes the display image generation section 20, such as described above. Various types of apparatus configuration examples will be illustrated in FIG. 9 and FIG. 10 as the electronic device.

FIG. 9A is an example in which the image processing apparatus 1 and the image processing apparatus 2 are constituted in an apparatus DVC1 which includes an imaging function.

The apparatus DVC1 of this example has an imaging section 12, a panorama combination section 10, an association section 11, a recording and reproduction section 13, a display image generation section 20, and a display section 21.

For example, the imaging section 12 obtains a series of a plurality of frame image data FM for generating a panorama image, by an imaging operation of panorama image data. This plurality of frame image data FM is supplied to the panorama combination section 10 as an input image group FMS. The panorama combination section 10 generates panorama image data PD from the input image group FMS, and outputs panorama image data PD and panorama processing information Ip. The association section 11 performs the above described association process, and outputs a panorama image file PDr. The panorama image file PDr is recorded to a recording medium in the recording and reproduction section 13.

The panorama image file PDr read from the recording medium in the recording and reproduction section 13 is supplied to the display image generation section 20, and display image data PDdsp is generated. This display image data PDdsp is supplied to the display section 21, and a display such as a projection display is executed.

In this way, for example, the apparatus DVC1 can be assumed to be a digital still camera, a video camera, a mobile phone unit, a computer apparatus or the like, which includes a panorama imaging function, a recording and reproduction function, and a display function.

FIG. 9B is an example in which the image processing apparatus 1 and the image processing apparatus 2 are constituted in an apparatus DVC2 which includes an image data input function from the outside.

The apparatus DVC2 of this example has an input section 14, a panorama combination section 10, an association section 11, a recording and reproduction section 13, a display image generation section 20, and a display section 21. That is, when compared to the above described FIG. 9A, there will be cases where the input section 14 is included instead of the imaging section 12.

For example, the input section 14 inputs a series of a plurality of frame image data FM for generating a panorama image, which is obtained by an imaging operation of panorama image data in an external imaging apparatus. This plurality of frame image data FM is supplied to the panorama combination section 10 as an input image group FMS. The operations of each section hereinafter are the same as those of FIG. 9A.

In this way, the apparatus DVC2 is a device which performs panorama image generation by using frame image data FM obtained in an external imaging apparatus, or performs a display of a panorama image. For example, it can be assumed to be an image editing device, a recording and reproduction apparatus, a television reception device, a mobile phone unit, a computer apparatus or the like used by wired or wirelessly connecting to an imaging apparatus such as a digital still camera.

An apparatus DV3 of FIG. 9C is an example in which the image processing apparatus 1 and the image processing, apparatus 2 are constituted as a device which does not have the display section 21.

The Apparatus DVC3 of this example has an input section 14 (or an imaging section 12), a panorama combination section 10, an association section 11, a recording, and reproduction section 13, and a display image generation section 20. The display section 21 of this case becomes an external device connected to the apparatus DVC3. While the operations of each section are the same as those of FIG. 9A and FIG. 9B, the display image generation section 20 transmits the generated display image data PDdsp to the external display section 21, and causes a display such as a projection display to be executed.

In this way, the image processing apparatus 1 and the image processing apparatus 2 are capable of being executed as a device which does not have a display function.

FIG. 10A is an example of an apparatus DVC4 which becomes the image processing apparatus 1, and an apparatus DVC5 which becomes the image processing apparatus 2.

The apparatus DVC4 has an imaging section 12 (or an input section 14), a panorama combination section 10, an association section 11, and a recording section 13R.

The recording section 13R records a panorama image file PDr from the association section 11 to as portable recording medium 90. It can be assumed to be a memory card, an optical disc, a magnetic disc or the like as the portable recording medium 90.

The apparatus DVC5 has a reproduction section 13P, a display image generation section 20, and a display section 21.

The reproduction section 13P reproduces as panorama image file PDr from the portable recording medium 90, and supplies it to the display image generation section 20. The display image generation section 20 generates display image data PDdsp based on the panorama image file PDr, and causes a display of a panorama image to be executed by supplying to the display section 21.

In such an example, a configuration in which a panorama image file PDr is delivered by the portable recording medium 90 can be considered as a configuration in which the apparatus DVC4 which becomes the image processing apparatus 1 and the apparatus DVC5 which becomes the image processing apparatus 2 are different bodies. Note that, an example in which the external display section 21 is used can also be considered, which does not include the display section 21 in the apparatus DVC5.

FIG. 10B is an example of an apparatus DVC6 which becomes the image processing apparatus 1, and an apparatus DVC7 which becomes the image processing apparatus 2.

The apparatus DVC6 has an imaging section 12 (or an input section 14), a panorama combination section 10, an association section 11, and a communication section 15.

The communication section 15 transmits a panorama image file PDr from the association section 11 to the outside.

The apparatus DVC7 has a communication section 16, a display image generation section 20, and a display section 21.

The communication section 16 receives the panorama image file PDr transmitted from the apparatus DVC6, and supplies it to the display image generation section 20. The display image generation section 20 generates display image data PDdsp based on the panorama image file PDr, and causes as display of a panorama image to be executed by supplying to the display section 21.

In such an example, a configuration in which a panorama image file PDr is delivered by communication can also be considered as a configuration in which the DVC6 which becomes the image processing apparatus 1 and the DVC7 which becomes the image processing apparatus 2 are different bodies.

Communication between the communication sections 15 and 16 can also be considered for either wired communication or wireless communication. Further, it will be assumed that the communication is a so-called communication mode, such as communication by a cable connection between devices, communication by a Universal Serial Bus (USB) or the like, communication by a Local Area Network (LAN), or communication using a public network such as the internet. In addition, the communication section 15 may perform communication which uploads a panorama image file PDr to a server or the like on the interact, or the communication section 16 may perform communication which downloads a panorama image file PDr from a server. Further, the communication sections 15 and 16 may perform communication in which cloud computing is assumed.

Note that, an example in which the external display section 21 is used can also be considered, which does not include the display section 21 in the apparatus DVC7.

Heretofore, while device configuration examples have been shown, the device configurations which implement the image processing apparatuses 1 and 2 can be additionally considered for various types.

For example, in the case where a cloud computing system is assumed, the association section 11 and the display image generation section 20 can also be considered to be arranged on a network and not in user use devices.

Further, the above described panorama image file PDr is data to which a process is performed which associates panorama image data PD with information which shows that this panorama image data PD is a full circumference panorama image. While it can be considered that a file is made in which information which shows that it is a full circumference panorama image (for example, metadata or a dedicated program, which will be described later) is incorporated with the panorama image data PD as this panorama image file PDr, additional panorama image data PD and information which shows that it is a full circumference panorama image can be included as different files, and there will also be a mode in which these are associated by some information.

<3. First Configuration Example (Metadata)>

Figure 8:
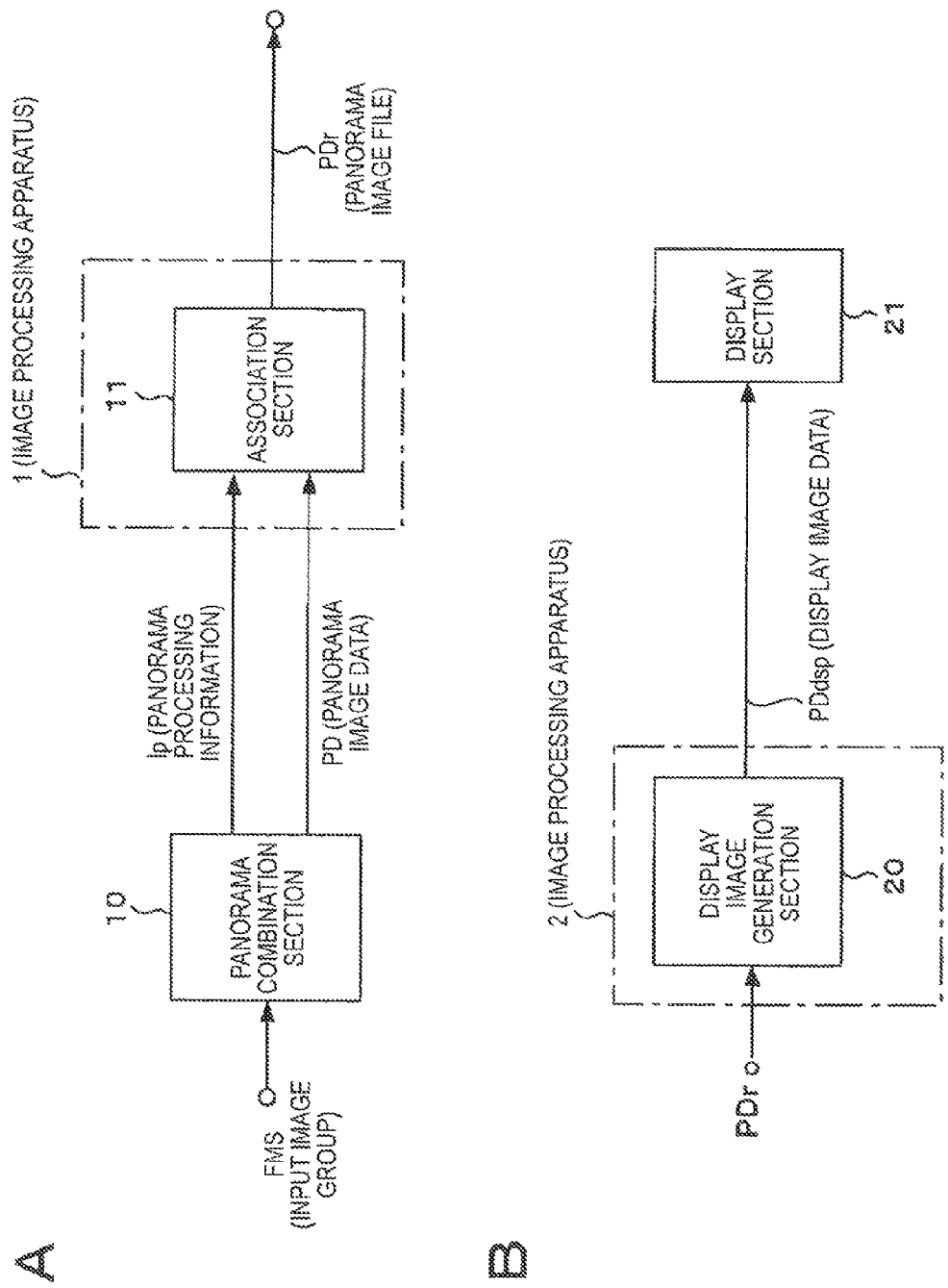
FIG. 8 is a block diagram of an image processing apparatus of an embodiment.

Hereinafter, specific configuration examples as the association section 11 and the display image generation section 20 shown in FIG. 8 will be described. A first configuration example is an example in which the association section 11 performs an association process using metadata.

FIG. 11A shows the panorama combination section 10 and the association section 11 in the image processing apparatus 1. In this first configuration example, the association section 11 has a metadata generation section 11a and a data integration section 11b.

The panorama combination section 10 generates panorama image data PD and outputs panorama processing information Ip.

The panorama processing information Ip is supplied to the metadata generation section 11a. The metadata generation section 11a generates metadata MT reflecting the panorama processing information Ip. There is panorama mode type information, 360° viewing angle determination information, both end alignment information, combination projection surface information, horizontal and vertical viewing angle information or the like as the content of the above described panorama processing information Ip.

In the case where the generated panorama image data PD is determined to be a full circumference panorama image, the panorama mode type information, the 360° viewing angle determination information or the both end alignment information front among these can become information which shows that this panorama image data PD is a full circumference panorama image.

The data integration section 11b generates a panorama image file PDr by integrating the panorama image data PD generated by the panorama combination section 10 with the metadata MT generated by the metadata generation section 11a. For example, the panorama image file PDr becomes a structure such as that of FIG. 11B. That is, it is a data file structure which includes a header, panorama image data PD, and metadata MT.

Figure 9:
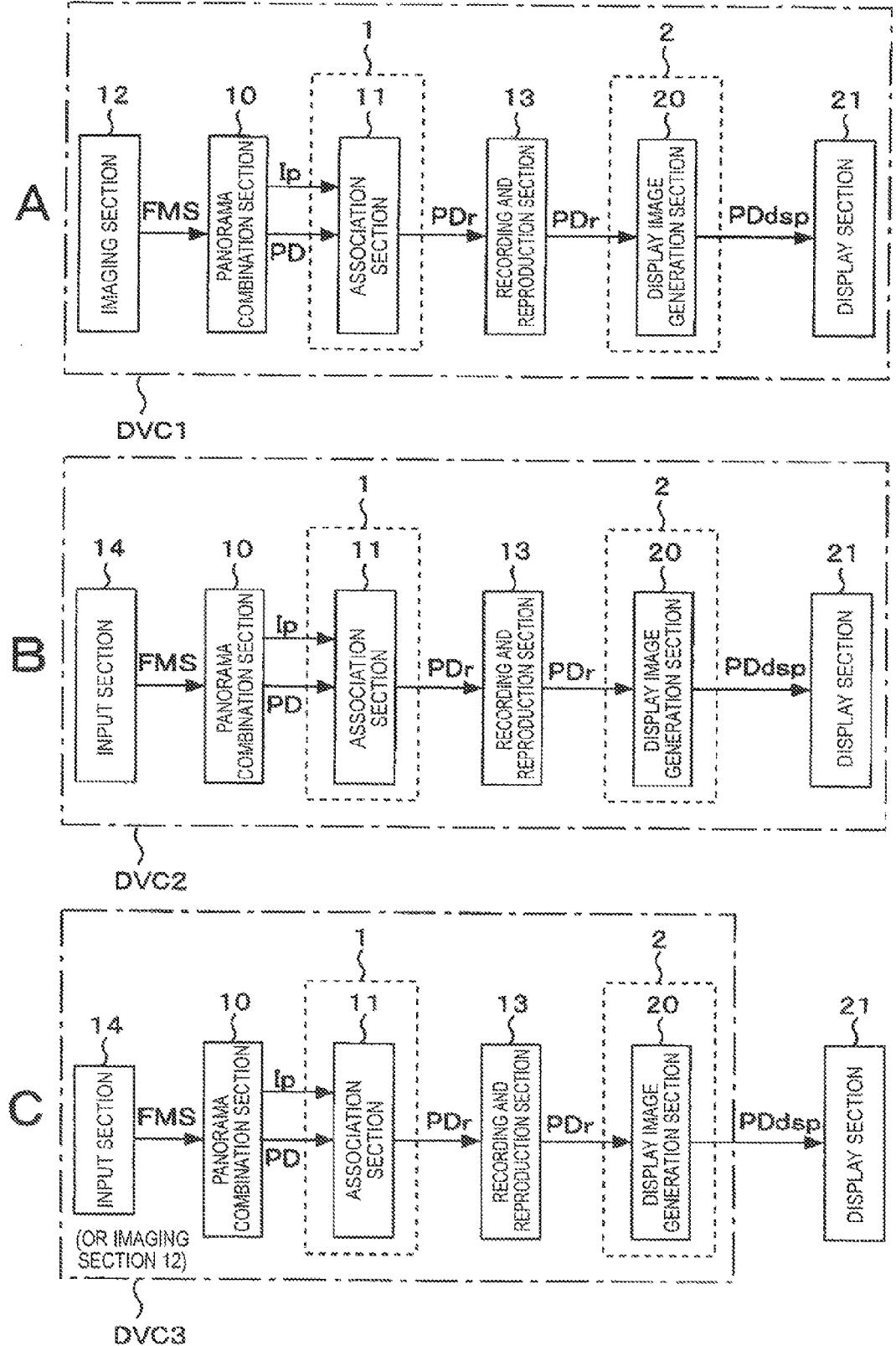
FIG. 9 is a block diagram of configuration examples of an image processing apparatus mounting device of an embodiment.
Figure 10:
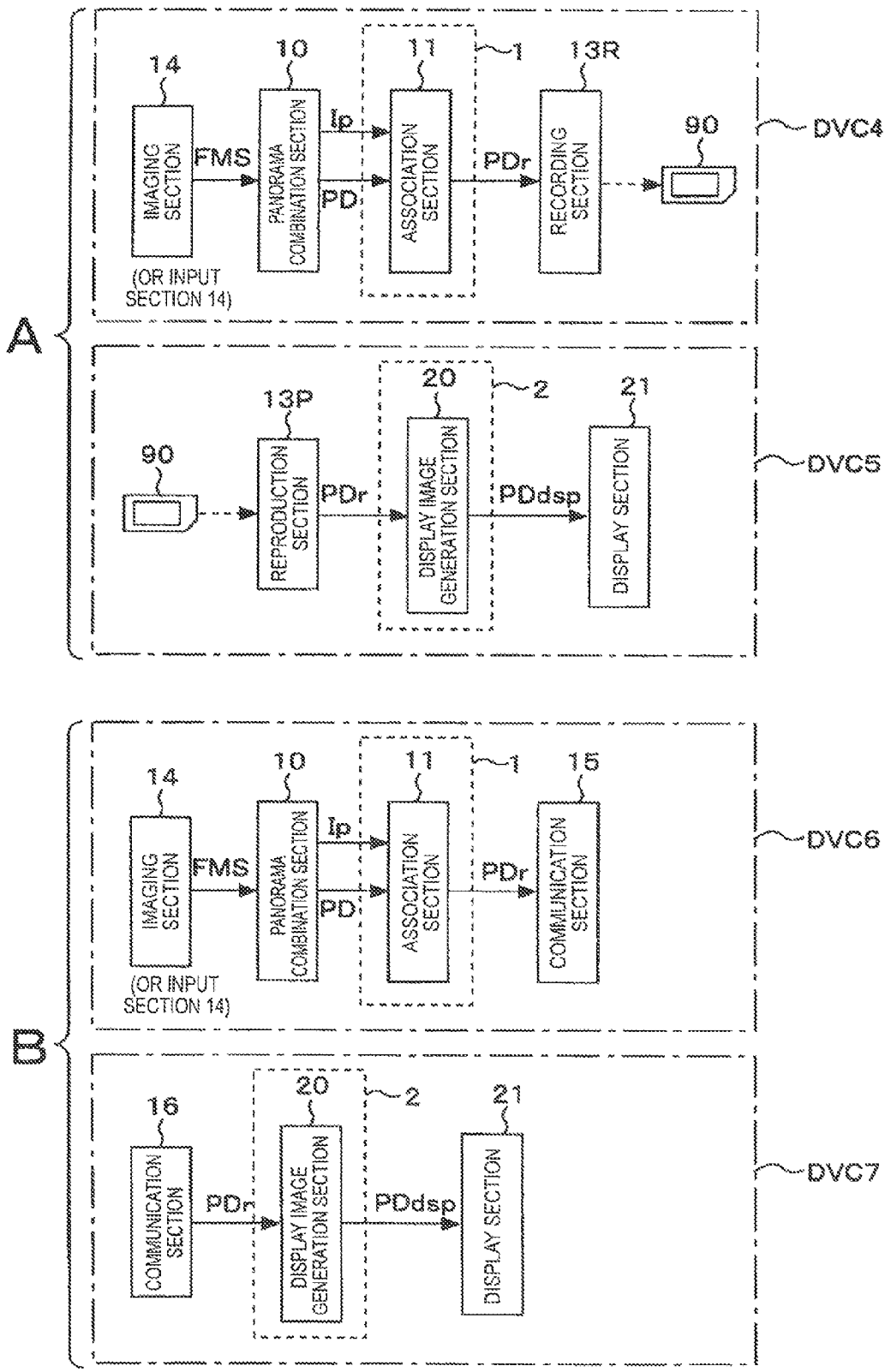
FIG. 10 is a block diagram of configuration examples of an image processing apparatus mounting device of an embodiment.

In each of the apparatuses DVC1 to DVC3, DVC4 and DVC6 illustrated in FIG. 9 and FIG. 10, such a panorama image file PDr is recorded to a recording medium or is transmitted and output.

FIG. 11C shows the display image generation section 20 in the image processing apparatus 2. In this first configuration example, the display image generation section 20 has a data separation section 20a, a metadata interpretation section 20b, and an image generation processing section 20c.

The panorama image file PDr, which is reproduced from the recording it) medium or is received, is input to the data separation section 20a. The data separation section 20a separates the metadata MT and the panorama image data PD from this panorama image file PDr.

The metadata MT is interpreted by the metadata interpretation section 20b, and is supplied to the image generation processing section 20c as panorama processing information Ip (panorama mode type information, 360° viewing angle determination information, both end alignment information, combination projection information, horizontal and vertical viewing angle information).

The image generation processing section 20c generates and outputs display image data PDdsp based on the panorama image data PD. At this time, it is determined whether or not to perform display image data PDdsp generation for a projection display, in accordance with the content of the panorama processing information Ip. That is, in the case where the panorama image data PD of a display target is determined to be a full circumference panorama image, a process for a projection display is performed, and in the case where it is not a full circumference panorama image, a process for a scroll display or a single view display, for example, is performed.

Then, the generated display image data PDdsp is supplied to a display section which is not illustrated, or a device having a display section, and a display is executed.

In each of the apparatuses DVC1 to DVC3, DVC5 and DVC7 illustrated in FIG. 9 and FIG. 10, this display image data PDdsp is supplied to the display section 21 and a panorama image display is performed.

Process examples of the above described image processing apparatus 1 and the image processing apparatus 2 are shown in FIG. 12.

FIG. 12A shows the processes of the panorama combination section 10 and the association section 11 as the image processing apparatus 1.

In step F1, the panorama combination section 10 obtains an input image group FMS.

In step F2, panorama image data PD is generated by having the panorama combination section 10 perform a panorama combination process. The panorama combination section 10 supplies panorama processing information Ip obtained in this panorama combination processing process to the association section 11 (the metadata generation section 11a).

In step F3, the association section 11 (the metadata generation section 11a) generates metadata MT based on the panorama processing information Ip.

In step F4, the association section 11 (the data integration section 11b) integrates the panorama image data PD with the metadata MT, and generates, for example, a panorama image file PDr such as that of FIG. 11B.

In step F5, the panorama image file PDr is recorded to a recording medium by a recording and reproduction section which is not illustrated, or is transmitted and output to an external device, a network or the like by a communication section which is not illustrated.

In FIG. 12B, the processes of the display image generation section 20 of the image processing apparatus 2 are shown.

In step F51, the display image generation section 20 (the data separation section 20a) obtains the panorama image file PDr, which is reproduced by the recording medium which is not illustrated, or is received by the communication section which is not illustrated.

In step F52, the display image generation section 20 (the data separation section 20a, the metadata interpretation section 20b) separates the panorama image data PD and the metadata MT from the panorama image file PDr, extracts the metadata MT, and obtains panorama processing information Ip by interpreting this.

In step F53, the display image generation section 20 (the image generation processing section 20c) branches the processes by whether or not the panorama image data PD of a display target of this time is a full circumference panorama image with a 360° viewing angle.

The determination of whether or not the panorama image data PD is a full circumference panorama image can be considered for various types.

By referring to 360° viewing angle determination information in the panorama processing information Ip, it can be determined whether or not the panorama image data PD has an exactly 360° viewing angle. Accordingly, it may be determined to be a full circumference panorama image in the case where it has an exactly 360° viewing angle.

Further, by referring to both end alignment information in the panorama processing information Ip, it can be determined whether or not the panorama image data PD has a 360° viewing angle, and a both end alignment process is performed. Accordingly, it may be determined to be a full circumference panorama image by setting, as a condition, having a 360° viewing angle and both end alignment being performed.

Further, by referring to panorama mode type information in the panorama processing information Ip, it can be determined whether or not panorama image data PD is captured in a is captured in a 360° panorama imaging mode, that is, whether or not it has an approximately 360° viewing angle. Accordingly, it may be determined to be a full circumference panorama image if it is captured in a 360° panorama imaging mode.

Note that, it may not necessarily be said that the panorama image data PD captured in a 360° panorama imaging mode has an exactly 360° viewing angle. This is because, in a 360° panorama imaging mode, while panorama image data PD is generated from frame image data FM obtained by a 360° sweep at the time of imaging, the sweep is performed by a user, and will not necessarily become an exactly 360 viewing angle. There will be cases where the user stops the sweep before reaching 360° Therefore, the panorama image data PD captured in a 360° panorama imaging mode becomes an image estimated to have an approximately 360° viewing angle.

In step F53, any of the above described determination techniques are used, and in the case where it is determined to be a full circumference panorama image, the display image generation section 20 (the image generation processing section 20c) proceeds to step F54, generates display image data PDdsp by performing a display projection process, and in step F55, performs a process which outputs this display image data PDdsp. The processes of these steps F54 and F55 are continued up to it becomes a display end, in step F56, by a user operation or an automatic process. In this way, in the display section, for example, a display so as to look over the full circumference or a display of an arbitrary direction is executed as a projection display.

Here, in a display projection process for performing a projection display, information of a viewing angle of a panorama image may be necessary. In the case of the present example, the panorama image data PD which becomes the process target of step F54 is determined to be a full circumference panorama image such as described above, and accordingly, the image generation processing section 20c may perform a display projection process by setting the panorama image data PD to a viewing angle of 360°. In this way, a high-quality projection display in which there are few image distortions can be performed.

Further, in a display projection process, panorama image data PD, to which projection is performed onto a projection surface (cylindrical surface, spherical surface, polygonal surface or the like) at the time of panorama combination, is re-projected onto a virtual plane surface screen VS. Accordingly, information of the projection surface of the panorama image data PD may become necessary. In the present example, by referring to combination projection surface information in the panorama processing information Ip, the image generation processing section 20c can accurately perform a re-projection process to the plane surface screen VS.

Further, in a projection display, by changing a horizontal and vertical viewing angle of the virtual plane surface screen VS, a display can be performed which looks over the surroundings in the horizontal and vertical directions the same as that of a scroll display. For example, by having a 360° viewing angle in the horizontal direction, while unrestricted scrolling can be performed in the horizontal direction, it will be restricted in the vertical direction. In this case, by referring to horizontal and vertical viewing angle information in the panorama processing information the image generation processing section 20c can restrict a scroll capable range of the vertical direction.

Note that, horizontal and vertical viewing, angle information may be information which is simply used for a restriction of a display range, without being used in the projection process itself to the plane surface screen VS for display. Therefore, accurate and high values of a viewing angle may be shown. At the time of the generation of panorama image data PD, it may not be necessary to perform difficult calculations for obtaining highly accurate horizontal and vertical viewing angles.

In step F53, in the case where it is determined not be a full circumference panorama image, in step F57, the display image generation section 20 (image generation processing section 20c) performs a display image data generation process of another system. For example, display image data PDdsp is generated as a scroll display or a single view display. Then, in step F58, a process is performed which outputs display image data PDdsp. The processes of these steps F57 and F58 are continued up to it is determined to be a display end, in step F59. In this way, in the display section, a scroll display or a single view display other than a projection display is executed.

In the case where it is not a full circumference panorama image, a projection display will not be able to be executed with a high quality, without the viewing, angle being exactly known. Accordingly, a scroll display or a single view display is performed.

In the first configuration example such as described above, in the image processing apparatus 1, the association section 11 generates a panorama image file PDr by associating metadata MT including information which shows that it is a full circumference panorama image with the panorama image data PD.

Combination projection surface information which shows the type of projection surface of the frame image data, at the time of panorama image generation, 360° viewing angle determination information of the panorama image data PD, both end alignment information, panorama mode information and horizontal and vertical viewing angle information are included in the metadata MT.

On the other hand, in the image processing apparatus 2, the display image generation section 20 generates display image data by performing a display projection process at the time when the panorama image data PD is determined to be a full circumference panorama image, and causes a projection display to be executed. The determination of a full circumference panorama image uses information which is associated as the metadata MD.

By such a configuration, a projection display can be automatically executed for a full circumference panorama image in which an accurate projection display can be executed, and a display with a sense of immersion can be provided for a user. On the other hand, by performing a display by another display system, at the time when a viewing angle which is not a full circumference panorama image is not able to be accurately specified, switching of a display operation can be performed so that a low-quality projection display is not performed.

Further, panorama mode type information, 360° viewing angle determination information, both end alignment information or the like are included as the metadata MT, and by having these associated with the panorama image data PD, a determination of whether or not it is a full circumference panorama image can be easily and accurately executed. That is, the selection of a display system becomes easy and accurate.

Further, by having combination projection surface information included in the metadata MT, a display projection process can be accurately performed.

<4. Second Configuration Example (Dedicated Program)>

A second configuration example of an embodiment will be described. In the second configuration example, the association section 11 of the image processing apparatus 1 associates a display processing program (a dedicated program) used for the display of a full circumference panorama image with the panorama image data PD, as information which shows that it is a full circumference panorama image.

Further, the display image generation section 20 of the image processing apparatus 2 determines that it is a full circumference panorama image, by having the display processing program associated with the panorama image data PD, and generates display image data by performing a display projection process based on this display processing program.

FIG. 13A shows the panorama combination section 10 and the association section 11 in the image processing apparatus 1. In this second configuration example, the association section 11 has a display processing program generation section 11d and a data integration section 11e.

The panorama combination section 10 generates panorama image data PD and outputs panorama processing information Ip.

The panorama processing information Ip is supplied to the display processing program generation section 11d. The display processing program generation section 11d causes a display processing program PG to be generated based on the panorama processing information Ip. By determining whether or not the panorama image data PD is a full circumference panorama image, by any of panorama mode type information, 360 viewing angle determination information and both end alignment information in the panorama processing information Ip, the display processing program generation section 11d causes a display processing program PG to be generated, in the case of a full circumference panorama image.

For example, since it is described in Flash (Adobe), QuickTimeVR (Apple) or HTML5, as the display processing program PG, reproduction and display is possible by a wide range of display devices.

The data integration section 11e generates a panorama image file PDr by integrating the panorama image data PD generated by the panorama combination section 10 with the display processing program PG generated by the display processing program generation section 11d. For example, the panorama image file PDr becomes a structure such as that of FIG. 13B. That is, it is a data the structure which includes a header, panorama image data PD and display processing program PG.

In each of the apparatuses DVC1 to DVC3, DVC4 and DVC6 illustrated in FIG. 9 and FIG. 10, such a panorama image file PDr is recorded to a recording medium, or is transmitted and output. Note that, as illustrated as the panorama image file PDr, while the panorama image data PD may be set to a normal panorama holding form, and may add a display processing program PG it may be set to a form which embeds the panorama image data PD in a display processing program itself.

FIG. 13C shows the display image generation section 20 in the image processing apparatus 2. In this second configuration example, the display image generation section 20 has a data separation section 20f and an image generation processing section 20c.

A panorama image file PDr, which is reproduced from a recording medium or is received, is input to the data separation section 20f. The data separation section 20a separates the panorama image data PD and the display processing program PG from this panorama image file PDr, and supplies them to the image generation processing section 20c.

Note that, in the case where the panorama image data PD is not a full circumference panorama image, the display processing program PG is not included in the panorama image file PDr, and therefore the data separation section 20f supplies only the panorama image data PD to the image generation processing section 20c.

The image generation processing section 20c generates and outputs display image data PDdsp based on the panorama image data PD. At this time, if the display processing, program PG is present, display image data PDdsp generation is performed for a projection display, by performing a process based on the display processing program PG. In the case where the panorama image data PD is not a full circumference panorama image, and the display processing program PG is not extracted, a process for another display, for example, a scroll display or a single view display, is performed.

Then, the generated display image data PDdsp is supplied to a display section which is not illustrated, or a device having a display section, and a display is executed.

In each of the apparatuses DVC1 to DVC3, DVC5 and DVC 7 illustrated in FIG. 9 and FIG. 10, this display image data PDdsp is supplied to the display section 21, and a panorama image display is performed.

Figure 14:
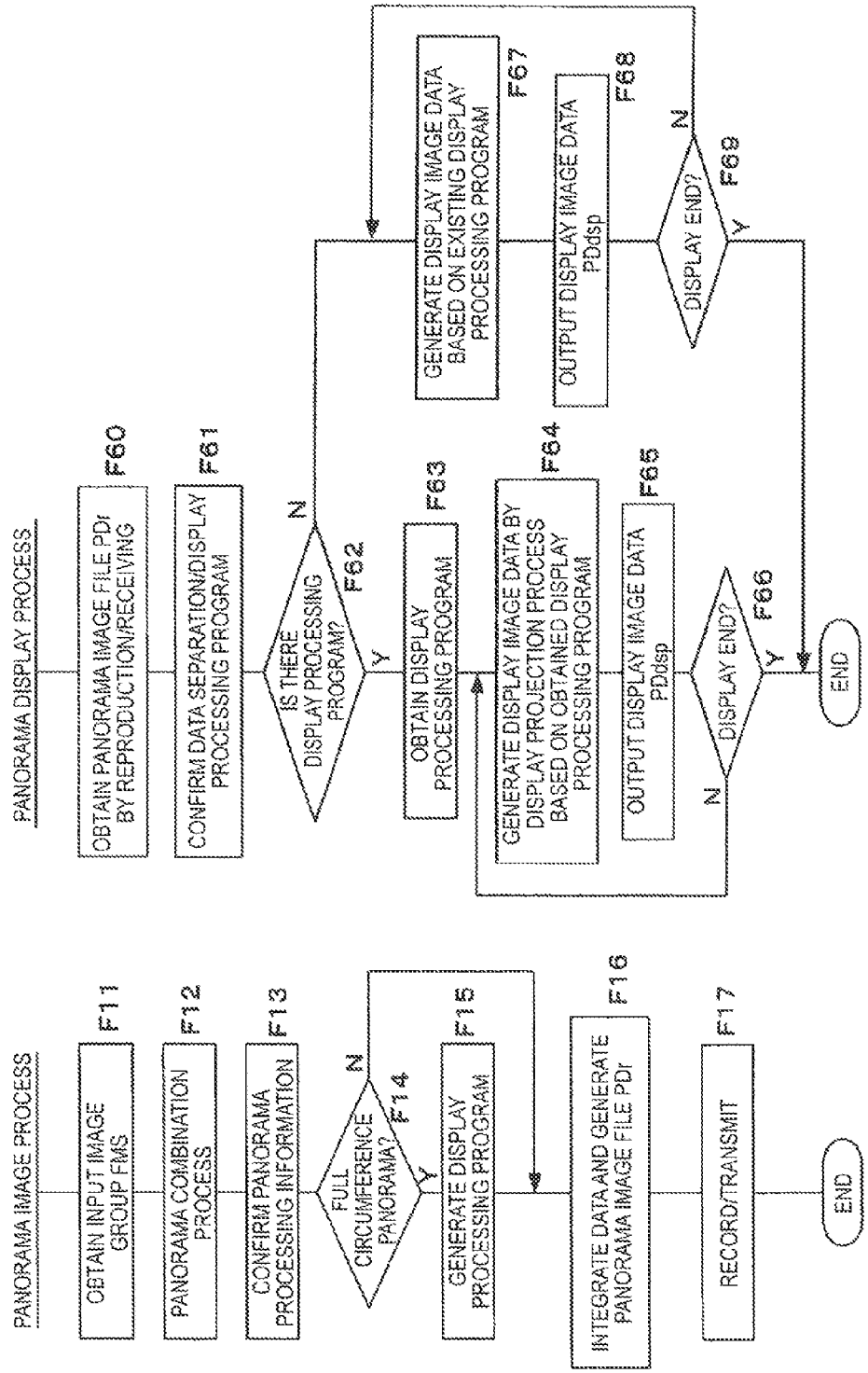
FIG. 14 is a flow chart of processes in the second configuration example of an embodiment.

Process examples of the above described image processing apparatus 1 and the image processing apparatus 2 are shown in FIG. 14.

FIG. 14A shows the processes of the panorama combination section 10 and the association section 11 as the image processing apparatus 1.

In step F11, the panorama combination section 10 obtains an input image group FMS.

In step F12, panorama image data PD is generated, by having the panorama combination section 10 perform a panorama combination process. The panorama combination section 10 supplies panorama processing information Ip obtained in this panorama combination processing process to the association section 11 (the display processing program generation section 11d).

In step F13, the association section 11 (the display processing program generation section 11d) confirms the panorama processing information Ip, and performs a determination of whether or not the generation panorama image data PD is a full circumference panorama image.

Similar to that stated in the first configuration example, the determination of whether or not it is a full circumference panorama image can be considered by a system which refers to 360° viewing angle determination information in the panorama processing information Ip, a system which refers to both end alignment information, a system which refers to a panorama mode type information or the like.

In the case where it is a full circumference panorama image, it proceeds from step F14 to F15, and the association section 11 (the display processing program generation section 11d) causes a display processing program PG to be generated.

In step F16, in the case where a display processing program PG is generated, the association section 11 (the data integration section 11b) integrates the panorama image data PD and the display processing program PG, and generates a panorama image file PDr such as that of FIG. 13B, for example. In the case where a display processing program PG is not generated, that is, in the case where it is not a full circumference panorama image, a panorama image file PDr which includes panorama image data PD is generated.

In step F17, the panorama image file PDr is recorded to a recording medium by a recording and reproduction section which is not illustrated, or is transmitted and output to an external device, a network or the like by a communication section which is not illustrated.

In FIG. 14B, the processes of the display image generation section 20 of the image processing apparatus 2 are shown.

In step F60, the display image generation section 20 (the data separation section 20f) obtains the panorama image file PDr, which is reproduced in the recording reproduction section which is not illustrated, or is received in the communication section which is not illustrated.

In step F61, the display image generation section 20 (the data separation section 20f) performs a separation process of the panorama image file PDr, and confirms whether or not a display processing program PG is included.

In step F62, the display image generation section 20 braches the processes in accordance with the presence or not of a display processing program PG.

In the case where a display processing program PG is present, in step F63, the display processing program PG is obtained, and is set to a state in which it is used as a program for display image generation by the image generation 20e.

Then, the display image generation section 20 (the image generation processing section 20c) proceeds to step F64, display image data PDdsp is generated by performing a display projection process in accordance with the display processing program PG, and in step F65, a process is performed which outputs this display image data PDdsp. The processes of these steps F64 and F65 are continued, up to it becomes a display end, in step F66, by a user operation or an automatic process. In this way, in the display section, for example, a display so as to look over the full circumference, a display of an arbitrary direction or the like is executed as a projection display.

Note that, information of a projection surface of the panorama image data PD, in which the panorama image data PD has a 360° viewing angle, may be described in the display processing program PG, such as horizontal and vertical viewing angle information for additional scroll restriction.

In the case it is determined, in step F62, that a display processing program PG is not present, the display image generation section 20 (the image generation processing section 20c) performs, in step F67, a display image data generation process based on an existing display processing program. For example, when display processing programs are stored as a scroll display or a single view display in the image generation processing section 20c, display image data PDdsp is generated as a scroll display or a single view display using these. Then, in step F68, a process is performed which outputs the display image data PDdsp. The processes of steps F67 and F68 are continued up to it is determined to be a display end, in step F69. In this way, in the display section, a scroll display or a single view display other than a projection display is executed. That is, a scroll display or a single view display is performed in the case where it is not a full circumference panorama image.

In the second configuration example such as described above, in the image processing apparatus 1, the association section 11 generates a panorama image file PDr by associating the display processing program PG for executing a projection display corresponding to a full circumference panorama image with the panorama image data PD.

On the other hand, in the image processing apparatus 2, if a display processing program PG is present, the display image generation section 20 generates display image data PDdsp for a projection display by performing a display projection process based on this display processing program PG.

By such a configuration, a projection display is automatically executed for a full circumference panorama image in which an appropriate projection display can be executed, and a display with a sense of immersion can be provided for a user. On the other hand, by performing a display by another display system, at the time when a viewing angle which is not a full circumference panorama image is not able to be accurately specified, switching of a display operation can be performed so that a low-quality projection display is not performed.

<5. Third Configuration Example (File Link Information)>

A third configuration example of an embodiment will be described. In the third configuration example, the association section of the image processing apparatus 1 performs a process which associates a data file including, information which shows that it is a full circumference panorama image with a data file including panorama image data PD.

Further, the display image generation section 20 of the image processing apparatus 2 confirms the data file associated, from the data file including the panorama image data PD, and determines whether or not it is a full circumference panorama image by acquiring information. Then, display image data is generated by performing a display projection process in the case where it is a full circumference panorama image.

FIG. 15A shows the panorama combination section 10 and the association section 11 in the image processing apparatus 1. In this third embodiment example, the association section 11 has a metadata generation section 11a and an association information addition section 11c.

The panorama combination section 10 generates panorama image data PD, and outputs panorama processing information Ip. The panorama processing information Ip (panorama mode type information, 360° viewing angle determination information, both end alignment information, combination projection information, horizontal and vertical viewing angle information or the like) is supplied to the metadata generation section 11a.

The metadata generation section 11a generates metadata MT reflecting the panorama processing information Ip.

As shown in FIG. 15B, the association information addition section 11c generates a panorama image file PDr1 which includes the panorama image data PD, and generates a data file PDr2 which includes the metadata MT. In this case, file link information LK1 and LK2 are added to the panorama image file PDr1 and the data file PDr2, respectively, and are mutually associated. The file link information LK1 is information which specifies the data file PDr2, and the file link information LK2 is information which specifies the panorama image file PDr1. Note that, the file link information which specifies the other may be added to only one of the panorama image file PDr1 and the data file PDr2.

In each of the apparatuses DVC1 to DVC3, DVC4 and DVC6 illustrated in FIG. 9 and FIG. 10, such a panorama image file PDr1 and data file PDr2 are recorded to recording mediums, or are transmitted and output. The recording mediums to which each of the files are recorded may be different recording mediums. Further, each of the files may be transmitted to a different device, a network server or the like.

FIG. 15C shows the display image generation section 20 in the image processing apparatus 2. In this third configuration example, the display image generation section 20 has an association information extraction section 20d, a corresponding data acquisition section 20e, a metadata interpretation section 20b, and an image generation processing section 20c.

The panorama image file PDr1, which is reproduced from the recording medium or is received, is input to the association information extraction section 20d. The association information extraction section 20d extracts the file link information LK1 from this panorama image file PDr1 and supplies it to the corresponding data acquisition section 20e, and supplies panorama image data PD to the image generation processing section 20c.

The corresponding data acquisition section 20e performs an access ACLK by using the file link information LK1, and acquires the associated data file PDr2. For example, the data file PDr2 is read by accessing a prescribed recording medium. Alternatively, the data file PDr2 is received by accessing a prescribed external device, network server or the like. Then, if the corresponding data acquisition section 20e acquires the data file PDr2, metadata MT is extracted, and is supplied to the metadata interpretation section 20b. That is, the metadata MT associated with the panorama image data PD of a display target of this time is obtained.

The metadata MT is interpreted by the metadata interpretation section 20b, and is supplied to the image generation processing section 20c as panorama processing information IP (panorama mode type information, 360° viewing angle determination information, both end alignment information, composition projection surface information, horizontal and vertical viewing angle information).

The image generation processing section 20c generates and outputs display image data PDdsp based on the panorama image data PD. At this time, it is determined whether or not to perform display image data PDdsp generation for a projection display, in accordance with the content of the panorama processing information Ip. That is, in the case where the panorama image data PD of a display target is determined to be a full circumference panorama image, a process for a projection display is performed, and in the case where it is not a full circumference panorama image, a process for another display, for example, a scroll display or a single view display, is performed.

Then, the generated display image data PDdsp is supplied to a display section which is not illustrated, or a device having a display section, and a display is executed.

In each of the apparatuses DVC1 to DVC3, DVC5 and DVC7 illustrated in FIG. 9 and FIG. 10, this display image data PDdsp is supplied to the display section 21, and a panorama image display is performed.

Figure 16:
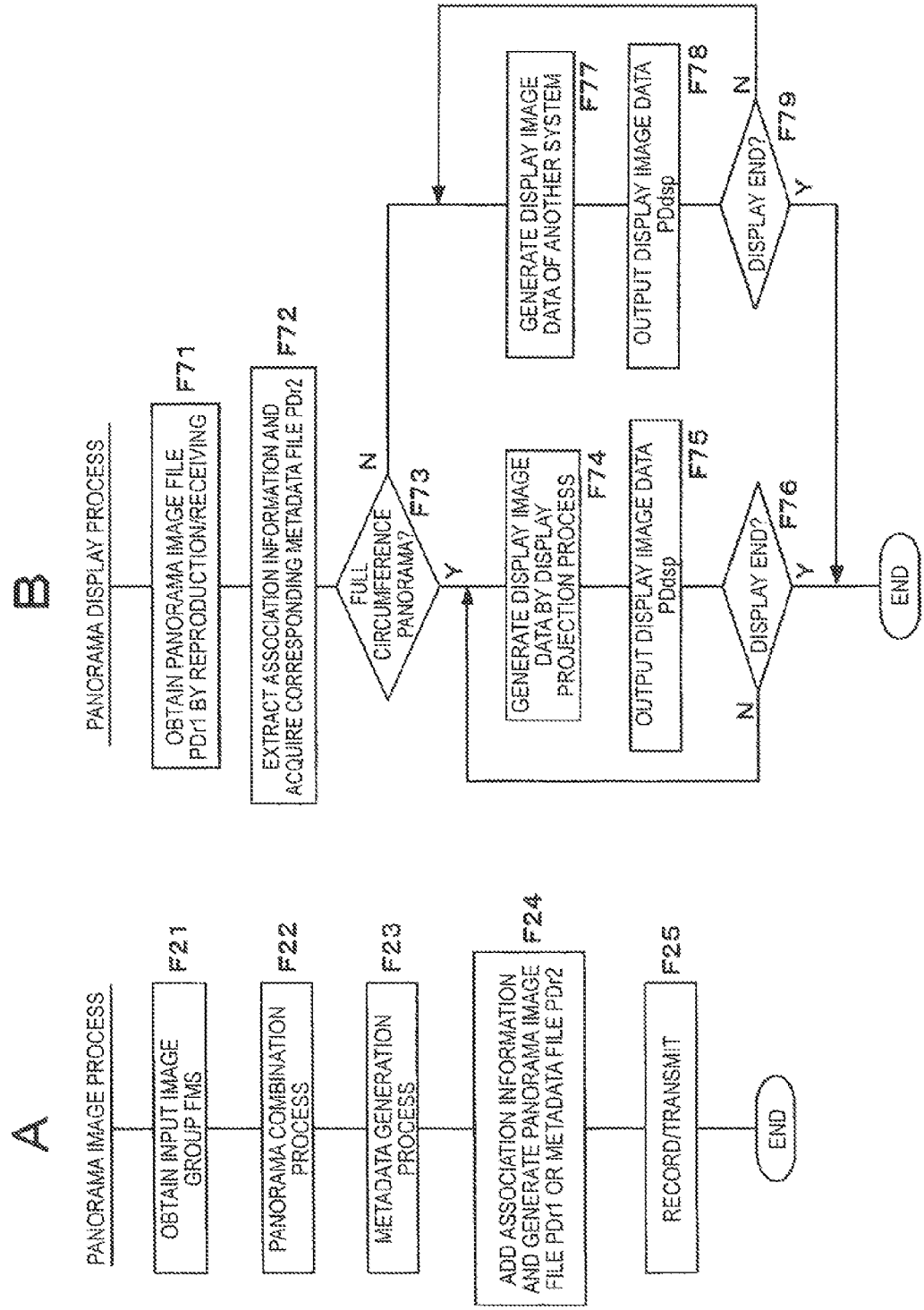
FIG. 16 is a flow chart of processes in the third configuration example of an embodiment.

Process examples of the above described image processing apparatus 1 and the image processing apparatus 2 are shown in FIG. 16.

FIG. 16A shows the processes of the panorama combination section 10 and the association section 11 as the image processing apparatus 1.

In step F21, the panorama combination section 10 obtains at input image group FMS.

In step F22, panorama image data PD is generated, by having the panorama combination section 10 perform a panorama combination process. The panorama combination section 10 supplies panorama processing information Ip obtained in this panorama combination processing process to the association section 11 (the metadata generation section 11a).

In step F23, the association section 11 (the metadata generation section 11a) generates metadata MT based on the panorama processing information Ip.

In step F24, the association section 11 (the association information addition section 11c) generates a panorama image file PDr1 which includes the panorama image data PD and the file link information LK1, or generates a data file PDr2 which includes the metadata MT and the file link information LK2.

In step F25, the panorama image file PDr1 and the data file PDr2 are recorded to a recording medium by a recording reproduction section which is not illustrated, or are transmitted and output to an external device, a network or the like by a communication section which is not illustrated.

FIG. 16B shows the processes of the display image generation section 20 of the image processing apparatus 2.

In step F71, the display image generation section 20 (the association information extraction section 20d) obtains the panorama image file PDr1 reproduced by the recording medium which is not illustrated, or received by the communication section which is not illustrated.

In step F72, the display image generation section 20 (the association information extraction section 20d, the corresponding data acquisition section 20e, the metadata interpretation section 20b) performs access by using the link information LK1 extracted from the panorama image file PDr1, and acquires the data file PDr2. Then, the metadata MT is extracted from the data file PDr2, and panorama processing information Ip is obtained by interpreting this.

In step F73, the display image generation section 20 (the image generation processing section 20c) branches the processes by whether or not the panorama image data PD of a display target of this time is a full circumference panorama image with a 360° viewing angle.

As described in the first configuration example, the determination of whether or not the panorama image data PD is a full circumference panorama image is possible by any of panorama mode type information, 360° viewing angle determination information and both end alignment information in the panorama processing information Ip.

In step F73, in the case where it is determined to be a full circumference panorama image, the display image generation section 20 (the image generation processing section 20c) proceeds to step F74, display image data PDdsp is generated by performing a display projection process, and in step F75, a process is performed which outputs this display image data PDdsp. The processes of these steps F74 and F75 are continued up to it becomes a display end, in step F76, by a user operation or an automatic process. In this way, in the display section, for example, a display so as to look over the full circumference, a display of an arbitrary direction or the like is executed as a projection display.

Note that, in this case, since the panorama image data PD is a full circumference panorama image, the viewing angle used in the display projection process may be set to 360°.

Further, by referring to combination projection surface information in the panorama processing information Ip, the image generation processing section 20c can accurately perform a re-projection process to a plane surface screen VS.

In the case where it is determined, in step F73, not to be a full circumference panorama image, the display image generation section 20 (the image generation processing section 20c) performs, in step F77, a display image data generation process of another system. For example, display image data PDdsp is generated as a scroll display or a single view display. Then, in step F78, a process is performed which outputs the display image data PDdsp. The processes of these steps F77 and F78 are continued up to it is determined to be a display end, in step F79. In this way, in the display section, a scroll display or a single view display other than a projection display is executed. That is, in the case where the panorama image data PD is not a full circumference panorama image, and the viewing angle is not accurately known, a scroll display or a single view display is performed.

In the third configuration example such as described above, in the image processing apparatus 1, the association section 11 generates a data file PDr2 which includes metadata MT including information which shows that it is a full circumference panorama image, and a panorama image file PDr1 which includes panorama image data PD, and associates these by the file link information LK1 and LK2.

On the other hand, the display image generation section 20 in the image processing apparatus 2 acquires the metadata MT associated with the panorama image data PD by using the link information, and determines whether or not the panorama image data PD is a full circumference panorama image from the metadata MT. Then, display image data is generated by performing a display projection process at the time when the panorama image data PD is determined to be a full circumference panorama image, and a projection display is executed.

By such a configuration, a projection display is automatically executed for a full circumference panorama image in which an appropriate projection display can be executed, and a display with a sense of immersion can be provided for a user. On the other hand, by performing a display by another display system, at the time when a viewing angle which is not a full circumference panorama image is not able to be accurately specified, switching of a display operation can be performed so that a low-quality projection display is not performed.

Note that, in FIG. 15 and FIG. 16 it is described by examples using metadata MT, it can also be considered by using the display processing program PG stated in the second configuration example.

For example, a display processing program PG which is not metadata MT is included in the data file PDr2 shown in FIG. 15B. It is an example in which, if a display processing program PG is included in the associated data file PDr2, the display image generation section 20 performs a generation process of display image data PDdsp for a projection display by using this display processing program PG.

Information which shows that it is a full circumference panorama image is included as a different file with the above described panorama image data PD, and modes in which these are associated can be considered for various types. As a related technique 1, for example, a Unique Material Identifier (UMID) is well known as information which refers to video material in video editing data (for example, refer to JP 2004-312233A). For example, the data file PDr2 of FIG. 15B may associate metadata MT with panorama image data PD in the panorama image file PDr1 which is a different file, by a mode such as UMID.

<6. Fourth Configuration Example (Dedicated Format)>

A fourth configuration example of an embodiment will be described. In the fourth embodiment, the association section 11 of the image processing apparatus 1 sets panorama image data itself to data of a specific format, as information which shows that it is a full circumference panorama image.

Further, the display image generation section 20 of the image processing apparatus 2 determines that it is a full circumference panorama image, by setting panorama image data to data of a specific format, and generates display image data by performing a display projection process.

FIG. 17A shows the panorama combination section 10 and the association section 11 in the image processing apparatus 1. In this fourth configuration example, the association section 11 has a format processing section 11f.

The panorama combination section 10 generates panorama image data PD and outputs panorama processing information Ip.

The format processing section 11f determines whether or not the panorama image data PD is a full circumference panorama image, by any of panorama mode type information, 360° viewing angle determination information and both end alignment information in the panorama processing information Ip. Then, in the case of a full circumference panorama image, a panorama image file PDr, which includes panorama image data PD of a dedicated format, is generated. In the case where it is not a full circumference panorama image, a panorama image file PDr, which includes panorama image data PD of a general normal format, is generated.

Note that, for example, panorama image data PD of as normal format is an image data form usually used such as a Joint Photographic Experts Group (JPEG) format or the like. On the other hand, a dedicated format is set to a new data format exclusively for a full circumference panorama image.

FIG. 17B shows the display image generation section 20 in the image processing apparatus 2. In this fourth configuration example, the display image generation section 20 has a format determination section 20*g*, and an image generation processing section 20*c*.

A panorama image file PDr, which is reproduced from a recording medium or is received, is input to the format determination section 20*g*. The format determination section 20*g* determines whether panorama image data PD included in the panorama image file PDr is a dedicated format or a general format. Then, the extracted panorama image data PD and format determination information FM are supplied to the image generation processing section 20*c*.

The image generation processing section 20*c* generates and outputs display image data PDdsp based on the panorama image data PD. At this time, it is determined whether or not it is a full circumference panorama image by the format determination information FM, and generation of display image data PDdsp for a projection display is performed if it is a full circumference panorama image. In the case where the panorama image data PD is not a full circumference panorama image, a process for another display, for example, a scroll display or a single view display, is performed.

Then, the generated display image data PDdsp is supplied to a display section which is not illustrated, or a device having a display section, and a display is executed.

Process examples of the above described image processing apparatus 1 and the image processing apparatus 2 are shown in FIG. 18.

FIG. 18A shows the processes of the panorama combination section 10 and the association section 11 as the image processing apparatus 1.

In step F41, the panorama combination section 10 obtains an input image group FMS.

In step F42, panorama image data PD is generated, by having the panorama combination section 10 perform a panorama combination process. The panorama combination section 10 supplies panorama processing information Ip obtained in the panorama combination process processing, with the panorama image data PD, to the association section 11 (the format processing section 11*f*).

In step F43, the association section 11 (the format processing section 11*f*) confirms the panorama processing information Ip, and performs a determination of whether or not the generated panorama image data PD is a foil circumference panorama image. Similar to that stated in the first configuration example, the determination of whether or not it is a full circumference panorama image can be considered by a system which refers to 360° viewing angle determination information in the panorama processing information Ip, a system which refers to both end alignment information, a system which refers to panorama mode type information or the like.

In the case where it is a full circumference panorama image, it proceeds from step F44 to F45, and the association section 11 (the format processing section 11*f*) generates a panorama image file PDr by converting the panorama image data PD into a dedicated format.

In the case where it is not a full circumference panorama image, it proceeds from step F44 to F46, and the association section 11 (the format processing section 11*f*) generates a panorama image file PDr which includes panorama image data PD of a normal format.

In step F47, the panorama image file PDr is recorded to a recording medium by a recording and reproduction section which is not illustrated, or is transmitted and output to an external device, a network or the like by a communication section which is not illustrated.

FIG. 18B shows the processes of the display image generation section 20 of the image processing apparatus 2.

In step F81, the display image generation section 20 (the format determination section 20*g*) obtains a panorama image file PDr reproduced by a recording reproduction section which is not illustrated, or receive by a communication section which is not illustrated.

In step F82, the display image generation section 20 (the format determination section 20*g*) determines the format of panorama image data PD included in the panorama image file PDr.

Then, in step F83, the display image generation section 20 branches the processes in accordance with a format determination result.

In the case where it is determined to be a dedicated format, the display image generation section 20 (the image generation processing section 20*c*) proceeds to step F84, display image data PDdsp is generated by performing a display projection, and in step F85, this display image data PDdsp is output. The processes of these steps F84 and F85 are continued up to it becomes a display end, in step F86, by a user operation or an automatic process. In this way, in the display section, for example, a display so as to look over the full circumference, a display of an arbitrary direction or the like is executed as a projection display.

Note that, the viewing angle of the panorama image data PD, which is used by a projection calculation in the display projection process, may be set to 360°.

Further, information of a projection surface of the panorama image data PD, horizontal and vertical viewing angle information for scroll limitation or the like may be considered by being embedded in the data form of a dedicated format.

In step F83, in the case where it is determined that it is not a dedicated format, the display image generation section 20 (the image generation processing section 20*c*) generates, in step F87, display image data PDdsp as another system, for example, a scroll display or a single view display. Then, in step F88, a process is performed which outputs the display image data PDdsp. The processes of these steps F87 and F88 are continued up to it is determined to be a display end, in step F89. In this case, in the display section, a scroll display or a single view display other than a projection display is executed.

In the fourth configuration example such as described above, in the image processing apparatus 1, the association section 11 makes a dedicated format in the case of a full circumference panorama image.

On the other hand, in the image processing apparatus 2, by determining, that the panorama image data PD is a full circumference panorama image if it is a dedicated format, the display image generation section 20 generates display image data PDdsp for a projection display by performing a display projection process.

By this configuration, a projection display is automatically executed for a full circumference panorama image in which an appropriate projection display can be performed, and a display which has a sense of immersion can be provided for a user. On the other hand, by performing a display by another display method, at the time when a viewing angle which is not a full circumference panorama image is not able to be accurately specified, switching of a display operation can be performed so that a low-quality projection display is not performed.

<7. Fifth Configuration Example (Application Example to an Imaging Apparatus)>

(7-1: Configuration of the Imaging Apparatus)

To continue, as a fifth configuration example of an embodiment, an imaging apparatus 50 will be described as a specific example by a device which includes the image processing apparatuses 1 and 2 of the present disclosure.

FIG. 19 shows a configuration example of the imaging apparatus 50.

The imaging apparatus 50 includes a lens unit 100, an imaging element 101, an image processing section 102, a control section 103, a display section 104, a memory section 105, a recording device 106, an operation section 107, a sensor section 108, and a communication section 109.

The lens unit 100 collects an optical image of a photographic subject. The lens unit 100 has a function which adjusts a focal distance, a photographic subject distance, an aperture or the like, so as to obtain an appropriate image, in accordance with an instruction from the control section 103. Further, it also has a camera-shake correction function for optically suppressing blurring of an image.

The imaging element 101 optically converts the optical image collected by the lens unit 100, and converts it into electrical signals. Specifically, it is implemented by a Charge Coupled Device (CCD) image sensor, a Complementary Metal Oxide Semiconductor (CMOS) image sensor or the like.

The image processing section 102 is constituted from a sampling circuit which samples electrical signals from the imaging element 101, an A/D conversion circuit which converts analog signals into digital signals, an image processing circuit which applies a prescribed image process to digital signals or the like. Here, this image processing section 102 is shown as performing a process which obtains frame image data by imaging with the imaging element 101, and performing a process which combines a panorama image.

This image processing section 102 includes not only a dedicated hardware circuit, but also a Central Processing Unit (CPU) or a Digital Signal Processor (DSP), and can perform software processes to accommodate flexible image processes.

The control section 103 is constituted from a CPU and a control program, and performs a control of each section of the imaging apparatus 50. The control program itself is actually stored in the memory section 105, and is executed by the CPU.

The processes of the panorama combination section 10 and the association section 11 disclosed in each of the above described configuration examples, and additionally the processes of the display image generation section 20, are executed by the control section 103 and the image processing section 102. Therefore, the image processing apparatuses 1 and 2 of the present disclosure are implemented by the control section 103 and the image processing section 102.

The display section 104 is constituted from a D/A conversion circuit which makes image data processed by the image processing section 102 and stored in the memory section 105 analog, a video encoder which encodes the image signals made analog in video signals of a form which is appropriate for a display device of a later stage, and a display device which displays an image corresponding to the input video signals.

The display device is implemented, for example, by a Liquid Crystal Display (LCD), an organic Electroluminescence (EL) panel or the like, and also has a function as a finder.

The memory section 105 is constituted from a semiconductor memory such as a Dynamic Random Access Memory (DRAM), and image data processed by the image processing section 102, control programs and various types of data in the control section 103 or the like are temporarily recorded.

The recording device 106 is constituted by a recording medium such as a semiconductor memory such as a flash memory (Flash Memory), a magnetic disc, an optical disc or a magneto-optical disc, and a recording and reproduction circuit/mechanism for these recording mediums.

At the time of imaging by the imaging apparatus 50, encoding is performed in a Joint Photographic Experts Group (JPEG) form by the image processing section 102, and JPEG image data stored in the memory section 105 is recorded to a recording media.

At the time of reproduction, JPEG image data held in a recording medium is read to the Memory section 105, and a decoding process is performed by the image processing section 102. It is possible for the decoded image data to be displayed by the display section 104, or to be transmitted and output to an external device by the communication section 109.

The operation section 107 includes input devices such as hardware keys such as a shutter button, up, down, left and right arrow keys, a determination key and a cancel key, an operation dial, a touch panel and a zoom lever, detects an input operation of a photographer (user), and transmits it to a control section 103. The control section 103 determines an operation of the imaging apparatus 50 in accordance with an input operation of the user, and performs a control so that each section performs necessary operations.

The sensor section 108 is constituted by a gyro sensor, an acceleration sensor, a geomagnetic sensor, a Global Positioning System (GPS) sensor or the like, and performs detection of various types of information. Apart from being added as metadata for captured image data, this information is also used for various types of image processes and control processes.

The communication section 109 performs communication with an external device or network communication. Specifically, various types of examples can be considered for the communication section 109, such as a USB communication section, a LAN communication section, a public network communication section such as the internet, or a dedicated communication section with a specific device. Further, the form of a transmission line may be either a wireless transmission line by electronic waves or infrared rays, or a cable transmission line by a cable connection. The signal mode can be assumed to be digital electronic signal communication, analog electronic signal communication, optical communication or the like.

The image processing section 102, the control section 103, the display section 104, the memory section 105, the recording device 106, the operation section 107, the sensor section 108 and the communication section 109 are mutually connected via a bus 110, and image data, control signals or the like are exchanged.

(7-2: Panorama Combination and Association Processes)

Next, a panorama combination process and an association process of the imaging apparatus 50 of the present embodiment will be described in detail.

Figure 20:
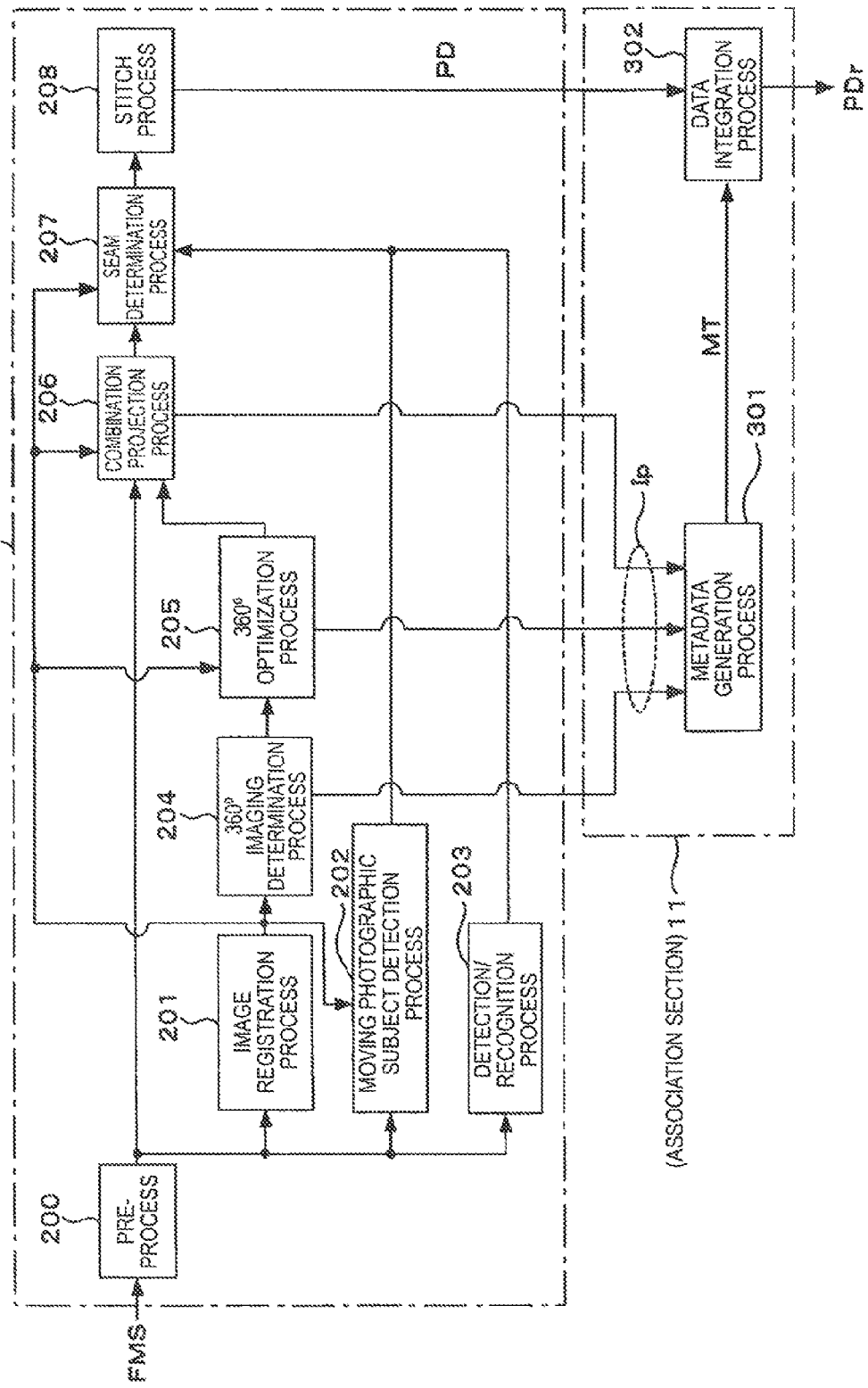
FIG. 20 is a block diagram of a functional configuration of a panorama combination section and an association section installed, in the imaging apparatus of an embodiment.

FIG. 20 shows, as functional configurations, the processes executed in the image processing section 102 and the control section 103 for the panorama combination process and the association process, and shows the processes executed by these functional configuration portions.

Note that, here, the example using metadata stated in the above described first configuration example will be described as the association process.

As shown by the dashed line in FIG. 20, the panorama combination section 10 and the association section 11 are included as functional configurations. That is, the image processing apparatus 1 is formed inside the imaging apparatus 50, by having a function included as the association section 11 by at least the image processing section 102, the control section 103 or the like.

Further, the process functions executed by the functions as the panorama combination section 10 will be described. In FIG. 20, the processes (algorithm flow) executed as the panorama combination section 10 are shown by each block. That is, in the panorama combination section 10, a pre-process 200, an image registration process 201, a moving photographic subject detection process 202, a detection/recognition process 203, a 360° imaging determination process 204, a 360° optimization process 205, a combination projection process 206, a seam determination process 207 and a stitch process 208 are performed.

Each of the processes will be described.

As described in FIG. 1, an input image group FMS which becomes a target of the pre-process 200 is frame image data FM#0, FM#1, FM#2 . . . sequentially obtained at the time when a photographer executes panorama imaging by the imaging apparatus 50.

In the panorama, combination section 10, first, the pre-process 200 for panorama combination is performed for images (each frame image data) captured by a panorama imaging operation of a photographer. Note that, here, an image process the same as that at the time of normal imaging is performed for the frame image data FM.

The input image is influenced by aberrations based on the characteristics of the lens unit 100. In particular, distortion aberrations of the lens will negatively affect the image registration process 201, and will reduce the accuracy of alignment. In addition, since artifacts are also generated in the seam vicinity of a combined panorama image, correction of the distortion aberrations is performed in this pre-process 200. By the correction of the distortion aberrations, there will be an effect in which the accuracy of the moving photographic subject detection process 202 and the detection/recognition process 203 are improved.

Next, in the panorama combination section 10, the image registration process 201, the moving photographic subject detection process 202 and the detection/recognition process 203 are performed for the frame image data to which the pre-process 200 has been performed.

It may be necessary to convert a plurality of frame image data into coordinates in a simple coordinate system at the time of panorama combination, and this simple coordinate system will be called a panorama coordinate system.

The image registration process 201 is a process which inputs two successive frame image data, and performs alignment in the panorama coordinate system. While information obtained by the image registration process 201 for two frame image data is a relative relation between the two image coordinates, a coordinate system of all the frame image data can be converted into a panorama coordinate system, by selecting one out of the plurality of image coordinate systems (for example, the coordinate system of the initial frame image data), and fixing it to the panorama coordinate system.

The specific processes performed in the image registration process 201 will be roughly divided into two as follows.

1. Detecting local movements within an image.
2. Obtaining full image global movements from the above described obtained local movement information.

In the above described process 1, generally:
Block matching
Characteristic point extraction and characteristic point matching such as Harris, Hessian, SIFT, SURF or FAST
or the like are used, and local vectors of characteristic points of the images are obtained.

In the above described process 2, robust estimation techniques such as:
A Least Squares Method
An M-Estimator
A Least Median Squares (LMedS) method
A RANdom SAmple Consensus (RANSAC)
is used as a local vector group obtained in the above described process 1, and an optimal affine transformation matrix or a projection transformation matrix (Homography), which states a relation between 2 coordinate systems, is obtained. In the present disclosure, this information will be called image registration information.

Further, in the panorama composition process, a part of a moving photographic subject in which a moving photographic subject is present in an imaging scene is divided in terms of the characteristics in which a plurality of frame image data is combined, and will cause a breakdown of an image such as becoming blurry or a reduction of the image quality. Accordingly, it is preferable to determine the seam of a panorama, upon detecting a moving photographic subject, by avoiding the moving photographic subject.

The moving photographic subject detection process 202 is a process which inputs 2 or more successive frame image data, and performs detection of a moving photographic subject. In the case where an example of a specific process is at a threshold or above where there is a difference in values of the pixels of the 2 frame image data in which alignment is actually performed, by image registration information obtained by the image registration process 201, these pixels will be determined to be a moving photographic subject.

Alternatively, a determination may be performed by using characteristic point information, which is determined as outliers (outliers) at the time of robust estimation of the image registration process 201.

In the detection/recognition process 203, position information such as a human face or body or an animal within captured frame image data is detected. Even if there is a high possibility of a human or animal being a photographic subject, which is not moving, in the case where the seam of the panorama is determined on this photographic subject, a sense of incompatibility will often occur visually compared to other objects, and therefore it is preferable to determine a seam by avoiding these objects. That is, information obtained in this detection/recognition process 203 is used for supplementing information of the moving photographic subject detection process 202.

A seam (junction) is determined in the seam determination process 207, which will be described later, based on information obtained in the moving photographic subject detection process 202 and the detection/recognition process 203.

The 360° imaging determination process 204 and the 360° optimization process 205 perform processes specialized for 360° full circumference imaging.

Here, in order to understand these processes, various problems at the time of 360° imaging will be described.

Figure 21:
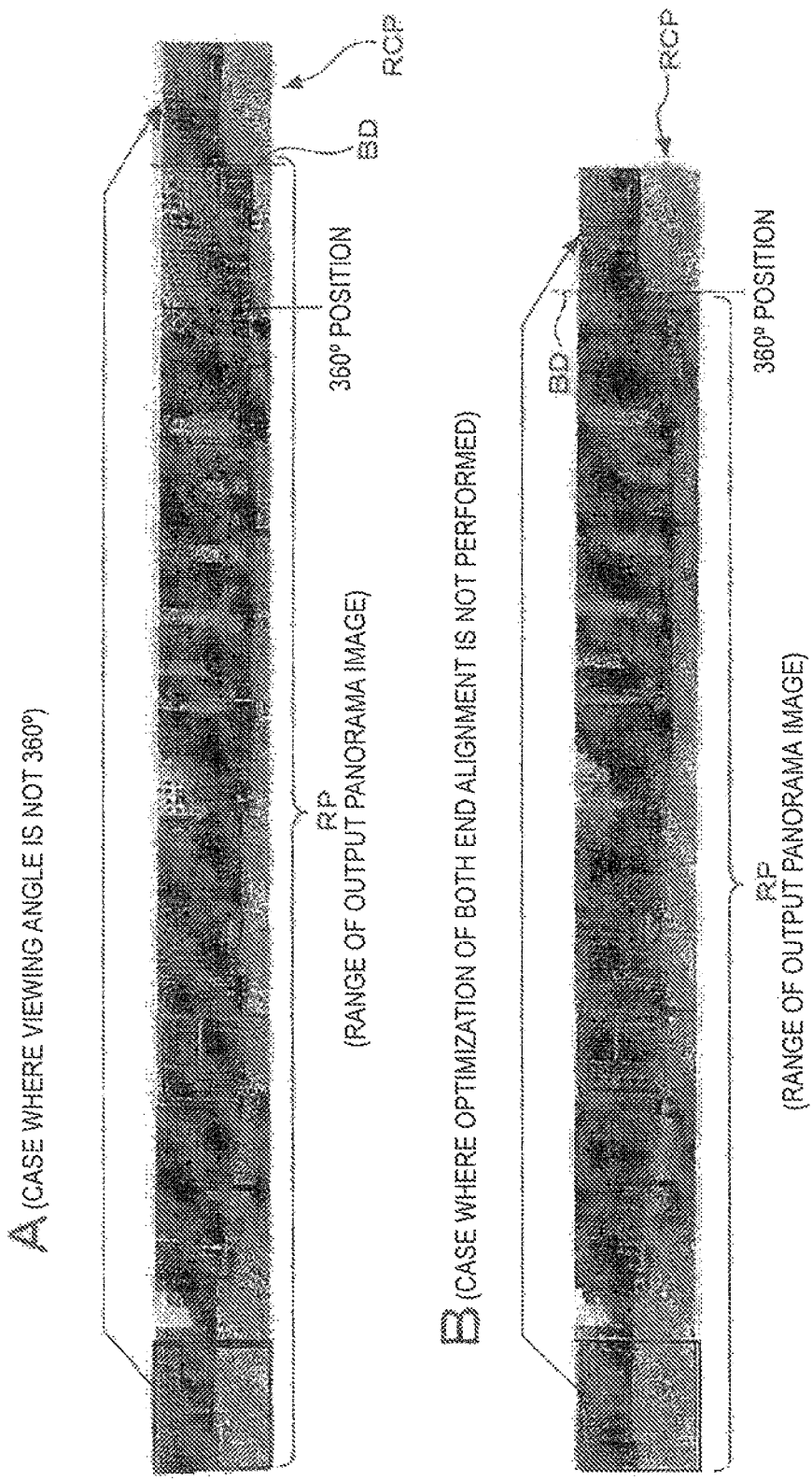
FIG. 21 is an explanatory diagram of panorama images, in the case were a viewing angle is not 360°, and to which alignment is not performed.
Figure 22:
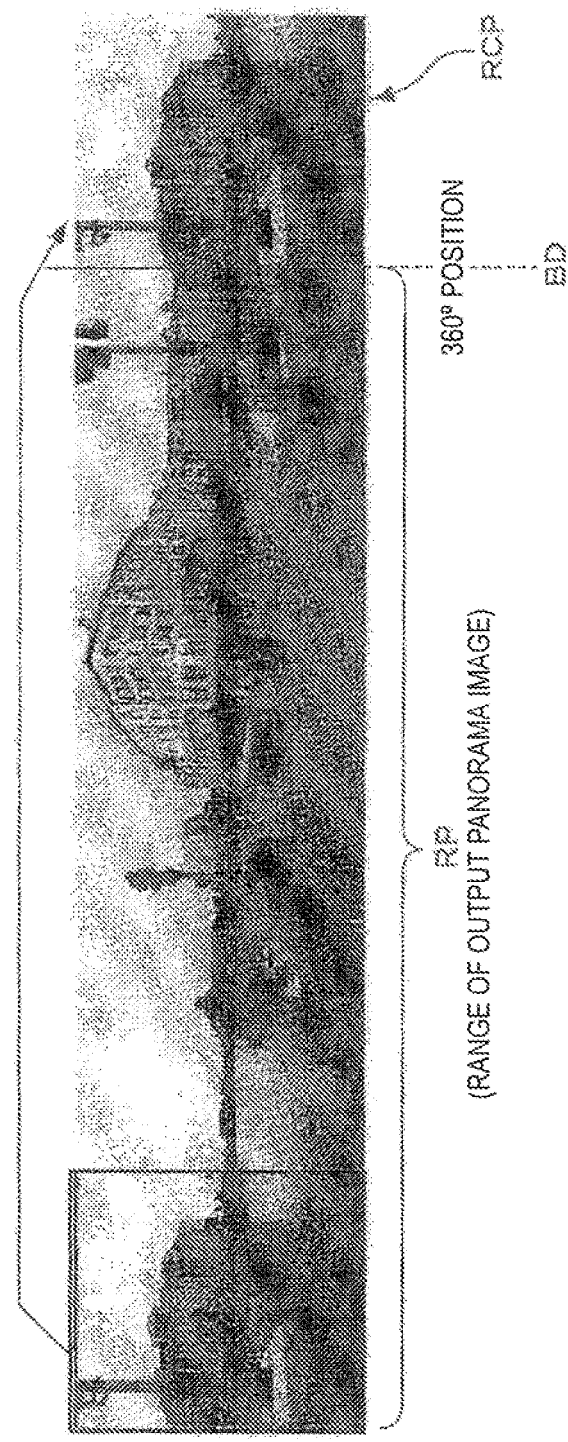
FIG. 22 is an explanatory diagram of a panorama image to which alignment is performed of an embodiment.

FIG. 21A, FIG. 21B and FIG. 22 are examples of panorama images in each of the cases. Note that, in these figures, in order to confirm continuity of the left end and the right end of the panorama images, a part of the left end regions of the panorama images are shown copied (image RCP) onto each of the right ends of the panorama images (the right side of the boundary line BD). An image portion in which the image RCP is excluded, that is, a portion shown by the range RP of the output panorama image, is a final one panorama image.

In the case where it is a 360° full circumference panorama, it is desirable for an image having continuity without gaps to be naturally connected on both sides of this boundary line BD.

In a panorama image in which a plurality of still images are combined, it will be difficult to accurately know a general panorama viewing angle. Usually a focal distance (f: pixel conversion value) of the lens of the imaging apparatus, to pixel number (l) of a sweep direction of the panorama image, and a panorama viewing angle (θ) have the following relation.

$$l = f\theta$$

However, since there are actually influences such as:
A radius of gyration when sweeping
Correction errors of distortion aberrations
Errors of a registration process, there can be significant differences with the viewing angle of an actual scene.

In the case where the registration process is limited to only parallel movement, and simplification is performed on an algorithm such as omitting a projection process, for the processing performance of the imaging apparatus, these errors will become more pronounced.

FIG. 21A is an example of a panorama image, to which a suitable 360° panorama image number is determined from the above equation, and a composition process is performed. It is combined by significantly exceeding 360° for errors, and there is no continuity of the left end and the right end (boundary line BD portion) of the panorama image.

In this way, while it is difficult to accurately determine a general panorama viewing angle, in the case where it is a 360° full circumference image, it is possible to determine a viewing angle by considering a constraint condition in which continuity of the left end and the right end of a panorama is obtained.

Figure 23:
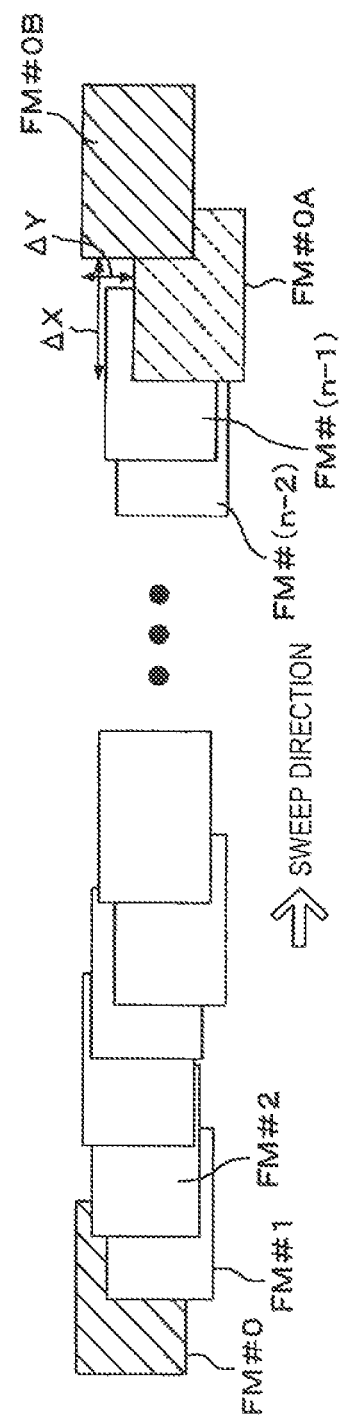
FIG. 23 is an explanatory diagram of alignment of a panorama image of an embodiment.

FIG. 23 will be referred to. FIG. 23 is a schematic diagram of an image group (frame image data FM#0 to FM#(n−1)) obtained by 360° panorama imaging.

Specifically, the following conditions are established, at the time when the sweep direction is assumed to be from left to right, and the first frame image data FM#0 used on the panorama left side is set to a 0° position, for the frame image data FM#0A of an image entirely the same as this, which is at a position prior to 360°, and the final frame image data FM#(n−1) used on the right end of the panorama image.

FM#0A and FM#(n−1) have overlapping regions.
FM#(n−1) is an image nearer to FM#0A on the left side than FM#0A.

By retrieving the frame image data FM#(n−1) as a final image which satisfies these conditions, a 360° position can be fixed.

In the imaging apparatus 50 of this example, this process is performed by the 360° imaging determination process 204.

In the 360° imaging determination process 204, in the case where the final frame image data FM#(n−1) which satisfies the above described two conditions can be determined, it is determined that the panorama image data within the combination process is a full circumference panorama image by 360° imaging. On the other hand, in the case where the final frame image data FM#(n−1) which satisfies the above described two conditions is not able to be determined, it is determined that the panorama image data within the combination process is not a full circumference panorama image.

This determination result becomes 360° viewing angle determination information which is one of the above described panorama processing information Ip. In the 360° imaging determination process 204, a process is performed which outputs the 360° viewing angle determination information to the association section 11.

Note that, this 360° imaging determination process 204 may be performed in the case where panorama imaging is executed in a 360° panorama imaging mode, in the cases other than a 360° panorama imaging mode (for example, a 180° panorama imaging mode or the like), it may not be necessary to performed this 360° imaging determination process 204. Note that, in this case, it may be set to information which shows it is a non-full circumference panorama image as the 360° viewing, angle determination information.

Further, in the process of this 360° imaging determination process 204, it may be output to the association section 11 by generating horizontal and vertical viewing angle information and panorama mode type information.

FIG. 21B is an example of a result of combining the final image determined in the 360° imaging determination process 204, that is, up to the frame image data FM#(n−1) which conforms to the above described two conditions.

Since a 360° position is determined in the 360° imaging determination process 204, it will become a 360° image as a panorama image. However, this example does not have continuity of the left end and the right end of a panorama similar to that of the example of FIG. 21A. While the position of the horizontal direction is suitable in this example, the position of the vertical direction will shift.

Since this performs alignment of each image between adjacent images, it will be generated by having errors accumulated in the registration process.

That is, in FIG. 23, there is a phenomenon in which a position (a position shown as the frame image data FM#0B) to be a first image prior to 360° for becoming a full circumference panorama with continuity is calculated for a position shown as the frame image data FM#0A for an accumulated error of the registration process.

In order to address this phenomenon, in the following 360° optimization process 205, in the case where it is determined to be 360° full circumference imaging in the 360° imaging determination process 204, the image registration information is optimized, by using the image registration information input from the image registration process 201, and the final image information determined by the 360° imaging determination process 204, and is appropriately corrected as a 360° frill circumference panorama.

This process is the previously stated process of both end alignment. That is, image registration information is adjusted so that there are no image gaps in the vertical direction and the horizontal direction, at both ends of the panorama image which are the 0° and 360° positions of the panorama image.

When described in FIG. 23, the positions of all the frame image data FM#0 to FM#(n−1) become optimized and corrected, so that the position of the frame image data FM#0A matches the position of the frame image data FM#0B.

Specifically, there is a technique which simply distributes accumulated errors to all the image registration information, a technique which performs optimization without impairment as long as the original registration information can be made using a least squares method or the like.

For example, a technique which simply distributes is that which is stated as follows. There are errors ΔX of the horizontal direction and errors ΔY of the vertical direction such as shown in FIG. 23 at the position of the frame image data FM#0A and the position of the frame image data FM#0B. The x-coordinate positions and the y-coordinate positions of n frame image data FM#0 to FM#(n−1) constituting the panorama image are each respectively shifted ΔX/n and ΔY/n. In this way, errors will be absorbed little by little in each frame image data FM, and the positions of virtual frame image data FM#0A as an image the same as that of the first frame image data FM#0 will match the positions shown as the frame image data FM#0B.

While each of the frame image data FM#0 to FM#(n−1) will shift slightly more than the original coordinates, the entire image quality will have hardly any deterioration.

FIG. 22 is an example of a result in which panorama combination is performed by using image registration information corrected by having a both end alignment performed such as described above in the 360° optimization process 205. By the 360° imaging determination process 204 and the 360° optimization process 205, it can be confirmed that an image will be naturally connected, without vertical and horizontal gaps at both ends of a panorama, as the range RP of an output panorama image.

By the 360° optimization process 205 such as described above, information of whether or not a both end alignment is executed becomes both end alignment information which is one of the panorama processing information Ip.

In the 360° optimization process 205, a process is also performed which outputs the both end alignment information to the association section 11.

Next, in the combination projection process 204, a projection process is performed on a single plane surface or a single curved surface such as a cylindrical surface or spherical surface for all the frame image data, based on the image registration information obtained by the image registration process 201 (or image registration information corrected in the 360° optimization process 205). Further, at the same time, a projection process is performed on the same plane surface or curved surface for moving photographic subject information and detection/confirmation information. A projection surface may be automatically selected from the viewing angle or the like at the time of imaging, or may be set in accordance with a user operation.

By considering optimization of pixel processing, the combination projection process 204 of frame image data may be performed as a process preceding the stitch process 208, or as a part of the stitch process 208. Further, for example, it may be simply performed as a part of the pre-process 200, prior to the image registration process 201.

Further, by being additionally simplified, it may be handled as an approximation of a cylindrical projection process without performing this processing.

Note that, the type of information of a projection surface in this combination projection process 206 becomes combination projection surface information which is one of the panorama processing information Ip.

In the combination projection process 206, a process is also performed which outputs the combination projection surface information to the association section 11.

The seam determination process 207 is a process which sets, to an input, image data from the combination projection process 206, image registration information from the image registration process 201, moving photographic subject information from the moving photographic subject detection process 202 and detection/confirmation information from the detection/recognition process 203, and determinates appropriate seams SM (seams SM0 to SM(n−2) described in FIG. 2 and FIG. 3), which have little failure as a panorama image.

In the seam determination process 207, first, a cost function is defined for overlapping regions between adjacent frame image data from the input information. For example, a total value may be set to a function value, which associates each appropriate overlap with the moving photographic subject information from the moving photographic subject detection process 202 and detection/confirmation information from the detection/recognition process 203, for each pixel of the overlapping regions.

In this case, since it has the meaning of the cost function value increasing with an increase in objects such as moving photographic subjects being present at this point, a collection of points with low cost function values may be seamed, in order for failures in the panorama image to be suppressed to a minimum.

In the case where there are n images (frame image data) used for panorama image combination, the number of these overlapping regions will become n−1, and the cost functions will be defined as n−1. Therefore, in order for optimal seams to be selected as an entire panorama image, a combination is obtained in which these n−1 cost functions are minimized. This is generally called a combination optimization problem, and the following solutions are well-known.

Methods for obtaining an exact solution
Branch and bound method
Memorization
Dynamic Programming technique (Dynamic Programming)
Graph cut
Methods which obtain an approximate solution
Local search method (Hill-climbing method)
Annealing method (Simulated Annealing)
Taboo search
Generic algorithm (Generic algorithm)

All of the seams SM1 to SM(n−2) can be obtained by any of the above described methods.

In the stitch process 208, a final panorama image is combined, by using all of the seams SM1 to SM(n−2) determined such as described above, and each of the frame image data FM#0 to FM#(n−1).

A blend process for reducing unnaturalness of junctions is performed for the regions of the seam surroundings, copying of simple pixels, that is re-sampling to a panorama coordinate system, is only performed for the regions other than these, and the entire image is connected.

By finally sweeping by considering a camera shake amount and trimming unnecessary portions of the vertical direction, a panorama image (panorama image data PD) with a wide viewing angle can be obtained, such as that which has a sweep direction set to a long side direction.

The above become the processes of the panorama combination section 10.

In the case of the present embodiment, the processes of the association section 11 are additionally performed for the panorama image data PD generated by the panorama combination section 10.

In the functional configuration example of FIG. 20 in the imaging apparatus 50 of this example, the previous functional configuration of FIG. 11A is adopted as the first configuration example. The association section 11 performs a metadata generation process 301 and a data integration process 302.

Various types of panorama processing information Ip are supplied from the panorama combination section 10 to the association section 11. That is, 360° viewing angle determination information obtained in the 360° imaging determination process 204, both end alignment information obtained in the 360° optimization process 205, and combination projection surface information obtained in the combination projection process 206 are supplied to the association section 11.

Note that, panorama mode type information and horizontal and vertical viewing angle information may also be additionally supplied.

The association section 11 generates metadata MT reflecting the panorama processing information Ip as a metadata generation process 301.

Note that, since a determination of whether or not it is a full circumference panorama image is performed in the processes of the display image generation section 20, which will be at least described later, and from the viewpoint of being used for performing a display projection process, it may not be necessary for the metadata MT to include all of the 360° viewing angle determination information, both end alignment information, combination projection surface information, panorama mode type information and horizontal and vertical viewing angle information.

While it has been described in the first configuration example to the fourth configuration example, the determination of whether or not it is a full circumference panorama image by the display image generation section 20 may refer to any of the 360° viewing angle determination information, both end alignment information and panorama mode type information. However, combination projection surface information may be necessary for appropriately performing a display projection process.

Accordingly, at least one of

360° viewing angle information and combination projection surface information

Both end alignment information and combination projection surface information

Panorama mode type information and combination projection surface information may be included as the panorama processing information Ip, generated by the panorama combination section 10, and made into metadata by the metadata generation section 11*a*.

In the data integration process 302, the association section 11 generates a panorama image file PDr by integrating the panorama image data PD generated by the panorama combination section 10 with the metadata MT generated by the metadata generation process 301.

For example, the panorama image file PDr becomes a structure which has image data and metadata such as that disclosed in FIG. 11B. More specifically, an example can be considered in which metadata such as an Exchangeable Image File Format (EXIF) is embedded within the image data. Note that it may be set to a file in which the panorama image data PD and the metadata MT are independent.

In the imaging apparatus 50 of the present example, processes are performed as the above described panorama combination section 10 and association section 11 in the image processing section 102 and the control section 103, and as a result of this, the panorama image file PDr is recorded to the recording device 106.

Note that, the panorama image file PDr may be externally transmitted from the communication section 109.

Figure 24:
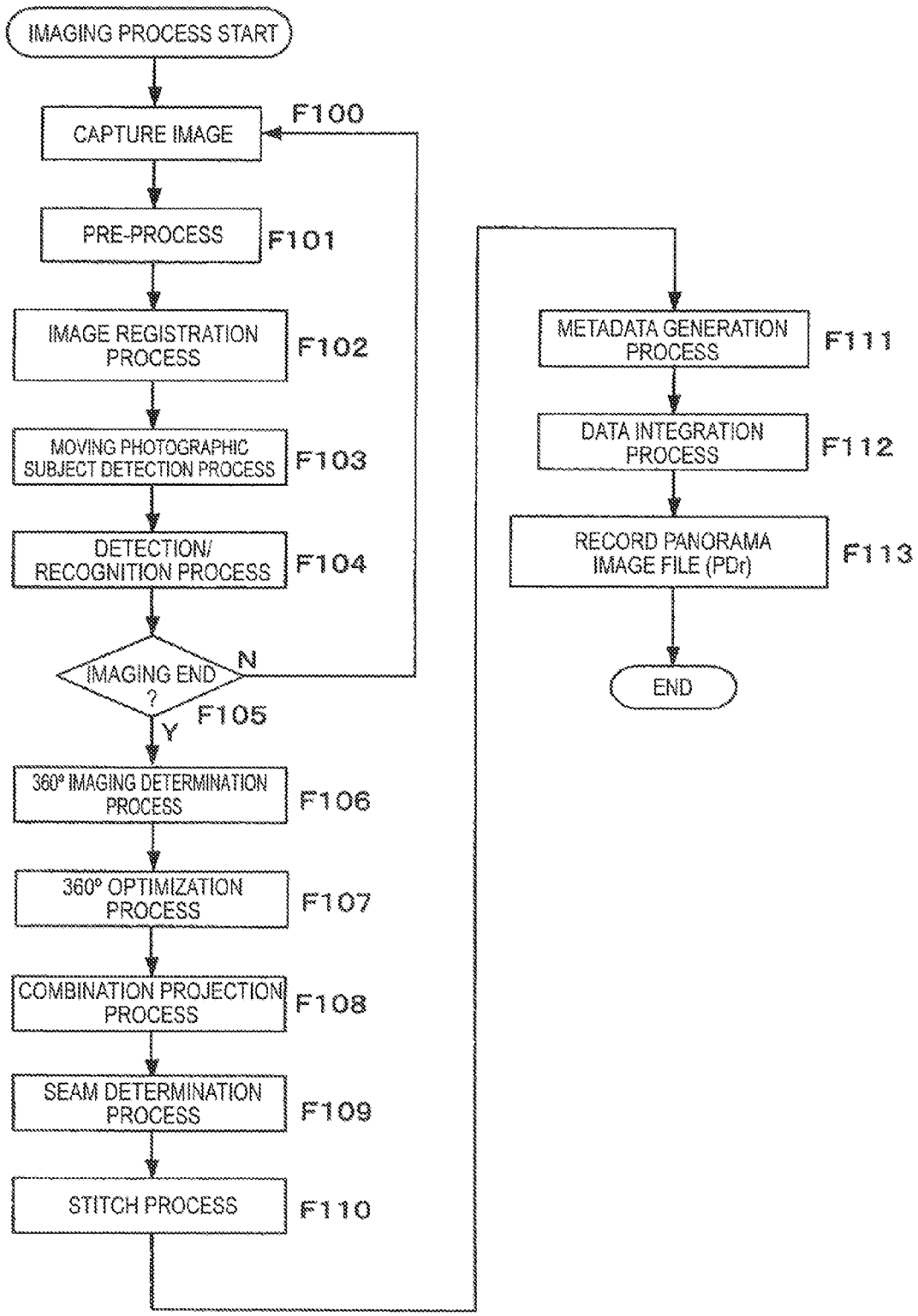
FIG. 24 is a flow chart of processes at the time of panorama imaging of an embodiment.

An example of the series of processes from panorama imaging up to recording, which includes the processes of the above described panorama combination section 10 and association section 11, is shown in FIG. 24.

The image capturing of step F100 captures one still image in a panorama imaging mode, and means an obtaining process as one frame image data within the imaging apparatus 1. That is, imaging signals obtained by the imaging element section 101 are imaging signal processed by the image processing section 102, by a control of the control section 102, and become one frame image data.

This frame image data may be supplied to the panorama combination processes (the processes of the panorama combination section 10 of FIG. 20) by the image processing section 102 as it is, or it may be supplied to the panorama combination processes by the image processing section 102 as one frame image data after being obtained once in the memory section 105.

The processes from step F101 onwards are performed, in accordance with an input of frame image data based on step F100, by the panorama combination section 10 of FIG. 20 implemented by the image processing section 102 and the control section 103.

In step F101, the panorama combination section 10 performs the pre-process 200.

In step F102, the panorama combination section 10 performs the image registration process 201.

In step F103, the panorama combination section 10 performs the moving photographic subject detection process 202.

In step F104 the panorama combination section 10 performs the detection/recognition process 203.

Note that, pixel information, image registration information, moving photographic subject information, detection/confirmation information or the like of an image obtained in each of these processes are temporarily stored in the memory section 105 as information corresponding to frame image data of respective process targets.

The above described processes are performed for each frame image data, up to it is an imaging end, in step F105.

If the above described processes are finished for all the obtained frame image data FM, in step F106, the panorama combination section 10 performs the 360° imaging determination process 204.

In step F107, the panorama combination section 10 performs the 360° optimization process 205.

Then, in step F108, the panorama combination section 10 performs the combination projection process 206, by using image registration information or the like adjusted in the 360° optimization process 205.

In step F109, the panorama combination section 10 determines the seams SM0 to SM(n−2), by performing the seam determination process 207.

In step F110, the panorama combination section 10 executes the stitch process 208. That is, each frame image data is connected by each of the seams SM0 to SM(n−2). A blend process is also performed when being connected. Hereinafter, one panorama image data PD is generated such as that shown in FIG. 3A.

To continue, the association section 11 performs the metadata generation process 301. That is, metadata MT is generated which reflects the panorama processing information IP supplied from the panorama combination section 10.

Then, in step F112, the association section 11 generates a panorama image file PDr by performing the data integration process 302.

The control section 103 performs a control which causes the panorama image file PDr generated in such a process as the panorama combination section 10 and association section 11 to be recorded to the recording device 106.

In the above described processes, the panorama image file PDr which includes the panorama image data PD and the metadata MT is recorded, and reproduction and display or the like becomes possible after this.

(7-3: Panorama Image Display)

To continue, an operation will be described in the case where the recorded panorama image file PDr such as described above is selected and displayed in the imaging apparatus 50.

First, the display operation modes performed by the display section 104 of the imaging apparatus 50 will be described in FIG. 25.

In the imaging apparatus 50, display operations of the above described four display modes of a single view display, a list display, a scroll display and a projection display are capable of being executed. FIG. 25 shows state transitions of the four display modes.

In order for simplification of the description, only a plurality of panorama image files PDr will be recorded to the recording device 106.

First, when a user specifies reproduction and display by using keys or the like of the operation section 107, the control section 103 sets the imaging apparatus 50 to a reproduction and display state. At this time, it transitions from an initial state to a single view display mode. Here, for example, the latest image of the panorama image file PDr is displayed such as that of FIG. 7A, for example. In this single view display mode, for example, it can be switched other images of the panorama image file PDr by having the user press the right arrow key and the left arrow key of the operation section 107.

Further, in a single view display, the state transitions to a list display such as that of FIG. 7B when the upper arrow key is pressed, and a list view of images is performed.

The state transitions again to a single view display, by having the user select an image to be a target using the up, down, left and right arrow keys, on this list display screen, and press the determination key, and the selected image of the panorama image file PDr is displayed.

In the case where the determination key is pressed, for example, in a single view display, an enlarged display is performed. Note that, here, an enlarged display will be a scroll display or a projection display.

The control section 103 refers to the metadata of the displayed image of the panorama image file PDr, and in the case where the panorama image the PDr is a full circumference panorama image, it transitions the state to a projection display mode, and a projection display is executed. In this case, a projection process is performed, in accordance with projection surface information at the time of combining which is recorded as metadata, and a projection display is started.

In this projection display mode, it is possible for a user to specify a change of viewing direction by using the up, down, left and right arrow keys, or a zoom-in, zoom-out by using the zoom lever. Further, in this case, by having horizontal and vertical viewing angle information recorded in metadata for a viewing direction and zoom value, a limitation is performed by the horizontal viewing angle or the vertical viewing angle as a panorama image, and therefore will not refer to that outside of the image.

In the case where there is no key operation for a fixed time, it is possible for an automatic viewing change to be performed by a menu setting.

In this projection display mode, it transitions to a single view display state when the user presses a cancel key, and a single view display is performed again.

In the case where the determination key is pressed in a single view display, and the displayed image of the panorama image file PDr is not a full circumference panorama image, it transitions to a scroll display mode, and a scroll display is executed.

In a scroll display mode, while scrolling is automatically started in the long side direction of a panorama, it is possible for the user to also specify scrolling in an arbitrary direction by using the up, down, left and right arrow keys, or a zoom-in or zoom-out by using the zoom lever.

In a scroll display mode, it transitions to a single view display state when the user presses a cancel key, and a single view display is performed again.

In the imaging apparatus 50 of the present embodiment with such display mode transitions as described above, a projection display is performed if it is a full circumference panorama image, and automatic switching of display operations, such as a scroll display being performed if it is not a full circumference panorama image, is performed.

If it is a full circumference panorama image, a high-quality projection display is automatically provided for the user. On the other hand, in the case where it is not a full circumference panorama image, it is possible for image distortions or the like to occur when performing a projection display, and a high-quality display is not be able to be guaranteed. Accordingly, a display of a panorama image is performed in a scroll display. That is, an appropriate display mode is selected in accordance with the panorama image.

Configurations and processes for performing such displays will be described in FIG. 26 and FIG. 27.

Figure 26:
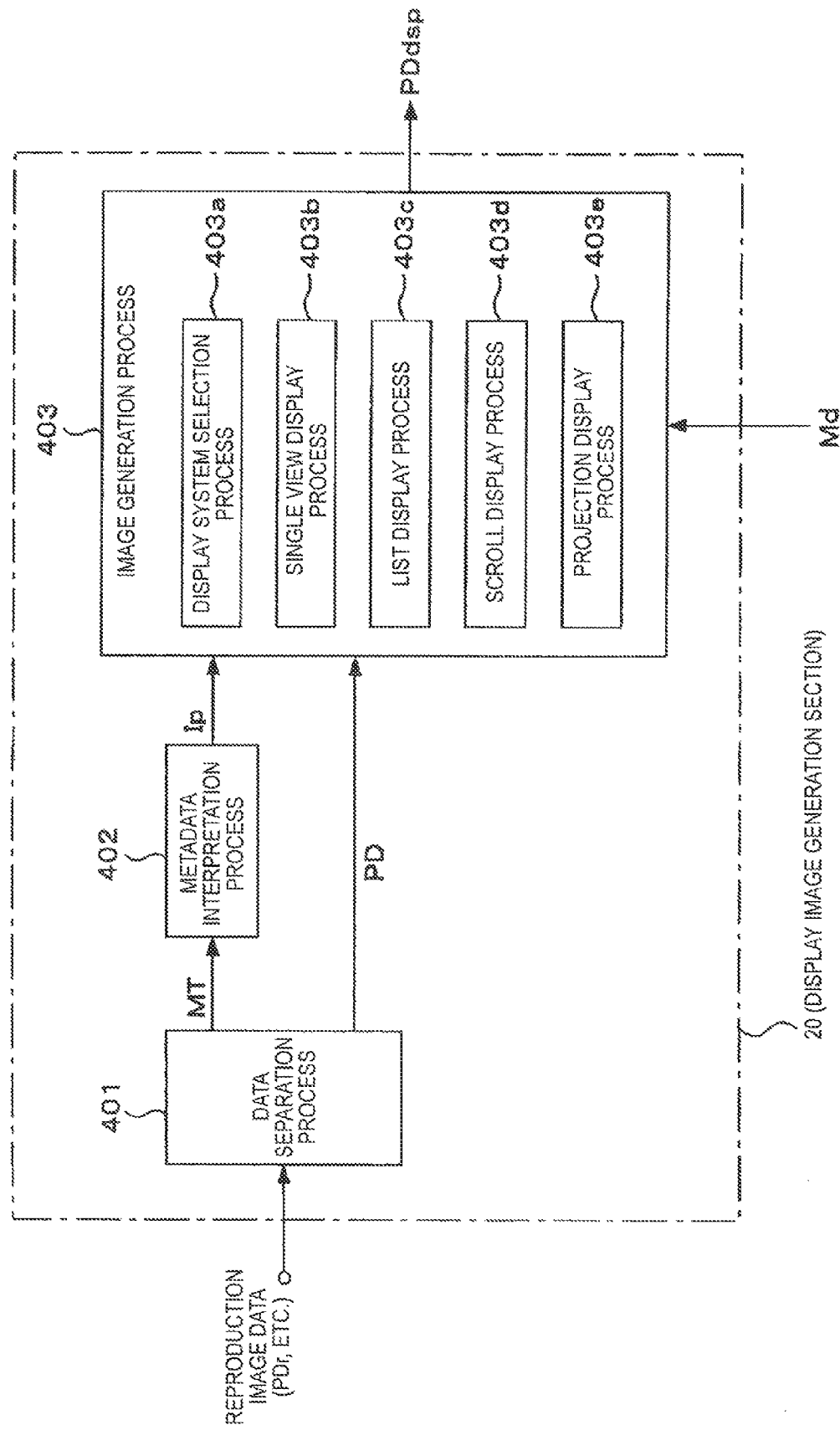
FIG. 26 is a block diagram of a functional configuration of a display image generation section installed in the imaging apparatus of an embodiment.

FIG. 26 shows the processes executed in the display image generation section 20 included in the control section 103 for the generation process of display image data PDdsp.

Note that, an example based on the example using metadata stated in the above described first configuration example will be set as the processes of the display image generation section 20.

The display image generation section 20 executed by software in the control section 103 performs a data separation process 401, a metadata interpretation process 402 and an image generation process 403 such as illustrated.

The display image generation section 20 separates metadata MT and panorama image data PD, as the data separation process 401, for a panorama image file PDr of a display target read from the recording device 106.

The separated metadata MT is interpreted by the metadata interpretation process 402, and is supplied to the image generation process 403 as panorama processing information Ip (panorama mode type information, 360° viewing angle determination information, both end alignment information, combination projection surface information, horizontal and vertical viewing angle information).

In the image generation process 403, display image data PDdsp is generated in accordance with display mode information Md, and is output to the display section 104.

A display system selection process 403a, a single view display process 403b, a list display process 403c, a scroll display process 403d and a projection display process 403e are performed as the image generation process 403.

In the display system selection process 403a, a process is performed which selects what display is to be executed, based on the display mode information Md corresponding to the above described display mode transitions based on a user operation or the like. Further, when moving to a scroll display mode or a projection display mode at the time of a state of a single view display mode, a scroll display mode and a projection display mode are selected, by referring to the panorama processing information Ip interpreted in the metadata interpretation process 402.

In the single view display process 403b, display image data PDdsp is generated as a single view display for the supplied panorama image data PD.

In the list display process 403b, for example, a list image is generated from thumbnail images or the like of each panorama image file PDr read from the recording device 106 and a process is performed which sets this to display image data PDdsp as a list display.

In the scroll display process 403d, display image data PDdsp is generated as a scroll display for the supplied panorama image data PD.

In the projection display process 403e, a display projection process is performed for the supplied panorama image data PD, and display image data PDdsp is generated as a projection display.

The display image data PDdsp generated in any of these processes is supplied to the display section 104 and a screen display is performed.

Figure 25:
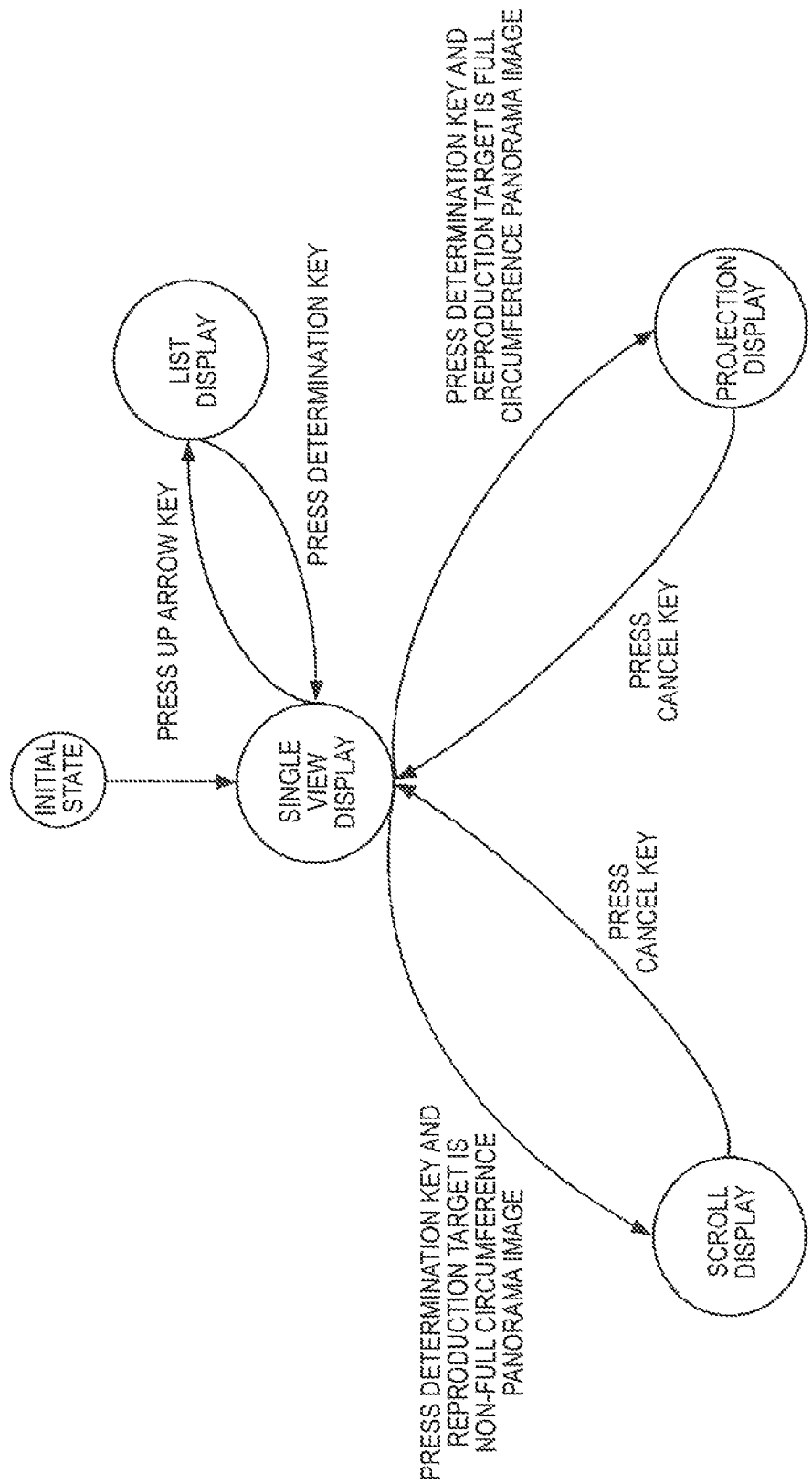
FIG. 25 is an explanatory diagram of display mode transition of an embodiment.

FIG. 27 shows a process example of the control section 103 (the display image generation section 20) corresponding to the display mode transitions of FIG. 25.

When reproduction and display is stated in accordance with a user operation or the like, in step F201, the display image generation section 20 performs the processes of a single view display mode. For example, the display image generation section 20 reads the latest panorama image file PDr from the recording device 106, generates display image data PDdsp by performing the single view display process 403b, and supplies it to the display section 104.

In the period of a single view display mode, the display image generation section 20 monitors a trigger of a mode transition or a display end in steps F202, F203 and F206 (the display system selection process 403a).

If the display image generation section 20 detects an end trigger, the reproduction and display operation ends from step F202.

The display image generation section 20 proceeds from step F203 to F204 when an operation of a list display mode is detected, and the list display process 403c is performed. For example, a list image is generated by reading thumbnail images of each panorama image file PDr from the recording device 106, and is supplied to the display section 104 as display image data PDdsp.

In step F205, the display image generation section 20 monitors a trigger of a list display end (the display system selection process 403a). In the case of a list display end, the single view display process 403b is performed by returning to step F201. For example, display image data PDdsp is generated as a single view display, for a panorama image selected in the list, and is supplied to the display section 104.

When an enlarged display (a scroll display or a projection display) is specified in a single view display state, the display image generation section 20 proceeds from step F206 to F207, and first confirms the panorama processing information Ip. That is, it is determined whether or not the image presently in a single view display is a full circumference panorama image. In this case, the display image generation section 20 can determine whether or not the panorama image data PD is a full circumference panorama image, by any of panorama mode type information, 360° viewing angle determination information and both end alignment information in the panorama processing information Ip.

In the case where it is a full circumference panorama image, the display image generation section 20 proceeds from step F208 to F211, generates display image data PDdsp, by performing the projection display process 403e, and supplies it to the display section 104.

In step F212, the display image generation section 20 monitors an end of a projection display mode, and returns to the single view display process 403b of step F201 if it is finished.

In the case where it is not a full circumference panorama image, the display image generation section 20 proceeds from step F208 to F209, generates display image data PDdsp, by performing the scroll display process 403d, and supplies it to the display section 104.

In step F212, the display image generation section 20 monitors an end of a projection display mode, and returns to the single view display process 403b of step F201 if it is finished.

Various types of displays are executed in the mode transitions shown in FIG. 25 by the above described processes.

That is, in the imaging apparatus 50, in the case where the panorama image data PD to be a display target is determined to be a full circumference panorama image, the control section 103 (the display image generation section 20) generates display image data PDdsp by performing a display projection process, and causes a projection display to be executed.

In the case where it is determined not to be a full circumference panorama image, display image data PDdsp is generated in a scroll display process of only sequentially cutting panorama image data PD from a projection surface at the time of combining, without performing a display projection process, and a scroll display is executed.

Note that, as a modified example of this process, in the case where it is determined not to be a full circumference panorama image, a single view display process may be performed, as a display process which does not perform a display projection process. For example, it is an example in which an enlarged display is not performed other than for a full circumference panorama image, even if a specification of an enlarged display is made in a single view display process.

Further, in the imaging apparatus 50 as the fifth configuration example of this embodiment, while an example has been set in which the image processing apparatuses 1 and 2 are installed in line with the above described first configuration example, an example can naturally be assumed in which the image processing apparatuses 1 and 2 are included in line with the above described second to fourth configuration examples.

<8. Sixth Configuration Example (Application Example to a Computer Apparatus and Program)>

An application example to a computer apparatus and a program will be described as a sixth configuration example. The processes as the above described image processing apparatuses 1 and 2 can be executed by hardware, or can be executed by software.

The program of an embodiment is a program, for example, which causes a calculation processing apparatus such as a Central Processing Unit (CPU) or a Digital Signal Processor (DSP) to execute the processes shown in the above described embodiment.

That is, a program which implements the image processing apparatus 1 is a program which causes a calculation processing apparatus to execute a process, in the case where panorama image data generated by using a plurality of frame image data obtained by an imaging operation while displacing an imaging direction is determined to be a full circumference panorama image, which associates the panorama image data with information which shows that it is a full circumference panorama image.

Specifically, this program may be a program which causes a calculation processing apparatus to execute the processes shown in FIG. 12A, FIG. 14A, FIG. 16A, FIG. 18A or FIG. 24.

Further, a program which implements the image processing apparatus 2 is a program which causes a calculation processing apparatus to execute a process, in the case where panorama image data to be a display target is determined to be a full circumference panorama image, which generates display image data by performing a display projection process.

Specifically, this program may be a program which causes a calculation processing apparatus to execute the processes shown in FIG. 12B, FIG. 14B, FIG. 16B, FIG. 18B or FIG. 27.

By these programs, the above described, image processing apparatuses 1 and 2 can be implemented by using a calculation processing apparatus.

Programs such as these can be recorded in advance to an HDD, a ROM within a microcomputer having a CPU or the like as a recording medium built into a device such as a computer apparatus.

Alternatively, they can be temporarily or permanently stored (recorded) in a removable recording medium such as a flexible disc, a Compact Disc Read Only Memory (CD-ROM), a Magnet Optical (MO) disc, a Digital Versatile Disc (DVD), a Blu-ray disc (Blu-ray (registered trademark) disc), a magnetic disc, a semiconductor memory or a memory card. Such a removable recording medium can be provided as so-called package software.

Further, other than being installed in a personal computer or the like from a removable recording medium, such programs can be downloaded via a network such as a Local Area Network (LAN) or the internet, from a download site.

Further, if programs such as these, they will be suitable for wide-ranging provisions of the image processing apparatuses 1 and 2 of an embodiment. For example, by downloading a program to a personal computer, a portable information processing apparatus, a mobile phone unit, a game device, a video device, a Personal Digital Assistant (PDA) or the like, this portable information processing apparatus or the like can be set to the image processing apparatuses 1 and 2. For example, in a computer apparatus such as that shown in FIG. 28, processes the same as those of the image processing apparatuses 1 and 2 of an embodiment can be executed.

In FIG. 28, A CPU 71 of a computer apparatus 70 executes various types of processes in accordance with programs stored in a ROM 72 or programs loaded from a storage section 78 to a RAM 73. Further, necessary data or the like is also arbitrarily stored in the RAM 73 upon the CPU 71 executing various types of processes.

The CPU 71, the ROM 72 and the RAM 73 are mutually connected via a bus 74. Further, an input/output interface 75 is also connected to this bus 74.

An input section 76 constituted by a keyboard, a mouse or the like, an output section 77 constituted by a display constituted by a Cathode Ray Tube (CRT), LCD, organic EL panel or the like, and a speaker or the like, a storage section 78 constituted by a hard disc or the like, and a communication section 79 constituted by a modem or the like, are connected to the input/output interface 75. The communication section 79 performs a communication process via a network which includes the internet.

Further, a drive 80 is connected to the input/output interface 75 as necessary, a removable media 81 such as a magnetic disc, an optical disk, a magneto-optical disc or a semiconductor memory is arbitrarily included, and computer programs read from these are installed in the storage section 78 as necessary.

In the case where the processes of the above described image processing apparatuses 1 and 2 are executed by software, programs constituting this software are installed from a network or a recording medium.

For example, as shown in FIG. 28, this recording medium is constituted by the removable media 81, separate from the apparatus body, which is distributed for delivering programs to a user. For example, the removable disc 81 is constituted by a magnetic disc (including a flexible disc), an optical disc (including a Blu-ray disc, a CD-ROM or a DVD), a magneto-optical disc (including a Mini Disc (MD)) or a semiconductor memory to which programs are recorded.

Alternatively, the recording medium is constituted by the ROM 72, a hard disc included, in the storage section 78 or the like, to which programs are recorded which are delivered to a user in a state built into the apparatus body in advance.

A computer apparatus 70 such as this implements the functions of the image processing apparatus 1, based on programs by the CPU 71, when inputting frame image data FM#0 to FM#(n−1) of n frames for panorama image generation, by a reception operation by the communication section 79, a reproduction operation by the drive 80 (removable media 81) or the recording section 78 or the like, and executes processes as the above described association section 11.

In this way, panorama image data is generated from the frame image data FM#0 to FM#(n−1) of the n input frames.

Further, the functions of the image processing apparatus 2 are implemented based on the programs by the CPU 71, for a display of a panorama image, and processes are executed as the above described display image generation section 20.

<9. Modified Example>

While an embodiment has been described heretofore, various types of modified examples can be considered for the image processing apparatuses of the present disclosure.

The first configuration example to the fourth configuration example can be adopted in a combined manner.

For example, adding a dedicated program with metadata as an association process, by combining the first configuration example and the second configuration example, performing processes of making a dedicated format with metadata as an association process, by combining the first configuration example and the fourth configuration example or the like can be considered.

While an example which includes the functions of both the association section 11 and the display image generation section 20 is set as the imaging apparatus 50 of the fifth configuration example, an example can also be considered, for example, which includes only the functions of one of the association section 11 and the display image generation section 20.

While there is no target of a projection display for panorama image data PD which is not a full circumference panorama image in an embodiment, a projection display may be performed by a specific operation. However, in this case, since an accurate three-dimensional model is not able to be built, there is the possibility for negative effects such as the occurrence of distortions to occur in a projection display image, and so there is the idea of allowing this as a special mode.

Besides being built into the above described imaging apparatus 50 or the computer apparatus 70, the image processing apparatus of the present disclosure is also useful for being built into a mobile phone unit, game machine or video machine having an imaging function, or a mobile phone unit, a game device, a video device or an information processing apparatus not having an imaging function but having a function which inputs frame image data.

The present technology may also be configured as below.

(1)

An image processing apparatus including:

an association section configured to, in a case where panorama image data generated by using a plurality of frame image data obtained by an imaging operation while displacing an imaging direction is determined to be a full circumference panorama image, associate the panorama image data with information showing that the panorama image data is the full circumference panorama image.

(2)

The image processing apparatus according to (1), wherein the panorama image data is determined to be the full circumference panorama image in a case where the panorama image data has a 360° viewing angle.

(3)

The image processing apparatus according to (1), wherein the panorama image data is determined to be the full circumference panorama image in a case where the panorama image data has a 360° viewing angle, and an alignment process of both image ends is performed.

(4)

The image processing apparatus according to (1), wherein the panorama image data is determined to be the full circumference panorama image in a case where the panorama image data is obtained by a 360° panorama imaging mode operation in which the panorama image data is generated by using a plurality of frame image data obtained by an imaging operation while displacing an imaging direction by approximately 360°.

(5)

The image processing apparatus according to any of (1) to (4), wherein the association section associates metadata, as the information showing that the panorama image data is the full circumference panorama image, with the panorama image data.

(6)

The image processing apparatus according to any of (1) to (4), wherein the association section associates a display processing program used for a display of the full circumference panorama image, as the information showing that the panorama image data is the full circumference panorama image, with the panorama image data.

(7)

The image processing apparatus according to any of (1) to (4), wherein the association section sets the panorama image data itself, as information showing that the panorama image data is the full circumference panorama image, to data of a specific format.

(8)

The image processing apparatus according to any of (1) to (4), wherein the association section associates a data file which includes the panorama image data with a data file which includes the information showing that the panorama image data is the full circumference panorama image.

(9)

The image processing apparatus according to (5), wherein information showing a type of projection surface of frame image data at the time of panorama image generation is included in the metadata.

(10)

The image processing apparatus according to (9), wherein the information showing a type of projection surface is information showing either a single plane surface, cylindrical surface, spherical surface or cube as a type of curved or planar projection surface.

(11)

The image processing apparatus according to any of (5), (9), and (10), wherein information of a 360° viewing angle determination result of the panorama image data is included in the metadata.

(12)

The image processing apparatus according to any of (5), (9), (10), and (11), wherein information showing a result of an alignment process of both image ends of the panorama image data is included in the metadata.

(13)

The image processing apparatus according to any of (5), (9), (10), (11), and (12), wherein information showing whether or not the panorama image data is obtained by a 360° panorama imaging mode operation, in which the panorama image data is generated by using a plurality of frame image data obtained by an imaging operation while displacing an imaging direction by approximately 360°, is included in the metadata.

(14)

The image processing apparatus according to any of (5), (9), (10), (11), (12), and (13), wherein information of a horizontal viewing angle and a vertical viewing angle of the panorama image data is included in the metadata.

(15)

The image processing apparatus according to any of (1) to (14), further including:

a panorama combination section configured to generate panorama image data by combining the plurality of frame image data obtained by the imaging operation while displacing the imaging direction.

The invention claimed is:

1. An image processing apparatus comprising:
an association section configured to associate panorama image data with panorama processing information showing that the panorama image data is a full circumference panorama image, the full circumference panorama image being generated by displacing an imaging device during an imaging operation in an imaging direction and including a plurality of frame image data, at least one of the plurality of frame image data including a seam portion that is not used in forming the full circumference panorama image;
a display image generation section configured to: (i) determine whether or not the panorama image data is the full circumference panorama image by use of the panorama processing information, and (ii) perform a display projection process on an output from the association section to obtain display image data when a determination result indicates that the panorama image data is the full circumference panorama image and perform another display process which is different from the display projection process on the output from the association section to obtain the display image data when the determination result indicates that the panorama image data is not the full circumference panorama image; and
a display device to display an image obtained from the display image data output from the display image generation section.

2. The image processing apparatus according to claim 1, wherein the panorama image data is determined to be the full circumference panorama image in a case where the panorama image data has a 360° viewing angle.

3. The image processing apparatus according to claim 1, wherein the panorama image data is determined to be the full circumference panorama image in a case where the panorama image data has a 360° viewing angle, and an alignment process of both image ends is performed.

4. The image processing apparatus according to claim 1, wherein the panorama image data is determined to be the full circumference panorama image in a case where the panorama image data is obtained by a 360° panorama imaging mode operation in which the panorama image data is generated by using a plurality of frame image data obtained by an imaging operation while displacing an imaging direction by approximately 360°.

5. The image processing apparatus according to claim 1, wherein the association section associates metadata, as the information showing that the panorama image data is the full circumference panorama image, with the panorama image data.

6. The image processing apparatus according to claim 1, wherein the association section associates a display processing program used for a display of the full circumference panorama image, as the information showing that the panorama image data is the full circumference panorama image, with the panorama image data.

7. The image processing apparatus according to claim 1, wherein the association section sets the panorama image data itself, as information showing that the panorama image data is the full circumference panorama image, to data of a specific format.

8. The image processing apparatus according to claim 1, wherein the association section associates a data file which includes the panorama image data with a data file which includes the information showing that the panorama image data is the full circumference panorama image.

9. The image processing apparatus according to claim 5, wherein information showing a type of projection surface of frame image data at the time of panorama image generation is included in the metadata.

10. The image processing apparatus according to claim 9, wherein the information showing a type of projection surface is information showing either a single plane surface, cylindrical surface, spherical surface or cube as a type of curved or planar projection surface.

11. The image processing apparatus according to claim 5, wherein information of a 360° viewing angle determination result of the panorama image data is included in the metadata.

12. The image processing apparatus according to claim 5, wherein information showing a result of an alignment process of both image ends of the panorama image data is included in the metadata.

13. The image processing apparatus according to claim 5, wherein information showing whether or not the panorama image data is obtained by a 360° panorama imaging mode operation, in which the panorama image data is generated by using a plurality of frame image data obtained by an imaging operation while displacing an imaging direction by approximately 360°, is included in the metadata.

14. The image processing apparatus according to claim 5, wherein information of a horizontal viewing angle and a vertical viewing angle of the panorama image data is included in the metadata.

15. The image processing apparatus according to claim 1, further comprising:
a panorama combination section configured to generate panorama image data by combining the plurality of frame image data obtained by the imaging operation while displacing the imaging direction.

16. An image processing method comprising:
performing a process which, when panorama image data generated by using a plurality of frame image data obtained by an imaging operation while displacing an imaging direction is determined to be a full circumference panorama image, associates the panorama image data with information showing that the panorama image data is the full circumference panorama image, at least one of the plurality of frame image data including a seam portion that is not used in forming the full circumference panorama image;
determining whether or not the panorama image data is the full circumference panorama image by use of the panorama processing information;
performing a display projection process to obtain display image data when a determination result indicates that the panorama image data is the full circumference panorama image and performing another display process which is different from the display projection process on the output to obtain the display image data when the determination result indicates that the panorama image data is not the full circumference panorama image; and
displaying, on a display device, an image obtained from the display image data.

17. A non-transitory computer readable medium having stored thereon a program which when executed causes a calculation processing apparatus to:

perform a process which, when panorama image data generated by using a plurality of frame image data obtained by an imaging operation while displacing an imaging direction is determined to be a full circumference panorama image, associates the panorama image data with information showing that the panorama image data is the full circumference panorama image, at least one of the plurality of frame image data including a seam portion that is not used in forming the full circumference panorama image;

determine whether or not the panorama image data is the full circumference panorama image by use of the panorama processing information;

perform a display projection process to obtain display image data when a determination result indicates that the panorama image data is the full circumference panorama image and perform another display process which is different from the display projection process on the output to obtain the display image data when the determination result indicates that the panorama image data is not the full circumference panorama image; and cause an image obtained from the display image data to be displayed on a display device.

18. The image processing apparatus according to claim 1, in which the another display process is a scroll display process.

19. The image processing apparatus according to claim 1, in which the another display process is a single view display process.

* * * * *